United States Patent

Olfat

(10) Patent No.: US 9,820,276 B2
(45) Date of Patent: Nov. 14, 2017

(54) WIRELESS NETWORKS, DEVICES AND METHODS THAT ESTABLISH ASYMMETRIC FREQUENCY DIVISION DUPLEX (FDD) LINKS USING A DOWNLINK FREQUENCY CARRIER AND MULTIPLE UPLINK FREQUENCY CARRIERS

(75) Inventor: Masoud Olfat, Great Falls, VA (US)

(73) Assignee: ATC TECHNOLOGIES, LLC, Reston, VA (US)

( * ) Notice: Subject to any disclaimer, the term of this patent is extended or adjusted under 35 U.S.C. 154(b) by 234 days.

(21) Appl. No.: 13/563,083

(22) Filed: Jul. 31, 2012

(65) Prior Publication Data
US 2014/0036743 A1 Feb. 6, 2014

(51) Int. Cl.
*H04W 72/04* (2009.01)
*H04W 36/00* (2009.01)

(52) U.S. Cl.
CPC .... *H04W 72/0453* (2013.01); *H04W 36/0072* (2013.01)

(58) Field of Classification Search
CPC ...... H04B 7/00; H04B 7/185; H04B 7/15542; H04B 7/204; H04J 1/00; H04J 9/00; H04L 5/0039; H04L 5/001; H04L 1/0026; H04Q 7/20; H04W 52/143; H04W 72/00; H04W 72/1289
See application file for complete search history.

(56) References Cited

U.S. PATENT DOCUMENTS

| 7,746,816 | B2 * | 6/2010 | Attar | H04J 9/00 370/252 |
| 8,310,981 | B2 * | 11/2012 | Damnjanovic | H04L 1/0026 370/319 |
| 2010/0118746 | A1 * | 5/2010 | Gerlach | H04W 72/1289 370/281 |

(Continued)

FOREIGN PATENT DOCUMENTS

WO WO 2011/035420 A1 3/2011

OTHER PUBLICATIONS

Alcatel-Lucent et al. "Control Channel Association for DL/UL Asymmetrical Carrier Aggregation", 3GPP TSG-RAN WG1 #58bis, R1-093768, Miyazaki, Japan, Oct. 12-16, 2009.

(Continued)

*Primary Examiner* — Andrew Lai
*Assistant Examiner* — Leon Andrews
(74) *Attorney, Agent, or Firm* — Michael Best & Friedrich LLP

(57) ABSTRACT

A node of a wireless network is configured to arrange a frequency division duplex communications link from the node to a user equipment using a downlink frequency carrier having a downlink frequency bandwidth, and from the user equipment to the node by selectively using either a first uplink frequency carrier having a first uplink frequency bandwidth or a second uplink frequency carrier that is spaced apart in frequency from the first uplink frequency carrier and having a second uplink frequency bandwidth.

(Continued)

The first uplink frequency carrier may initially be assigned to the user equipment, and the user equipment may be subsequently selectively handed over the second uplink frequency carrier, while continuing to use the downlink frequency carrier. Related nodes, user equipment and operating methods are described.

39 Claims, 17 Drawing Sheets

(56) References Cited

U.S. PATENT DOCUMENTS

| | | |
|---|---|---|
| 2011/0096735 A1 | 4/2011 | Damnjanovic et al. |
| 2011/0134877 A1* | 6/2011 | Noh .................. H04L 5/001 370/329 |
| 2011/0244860 A1 | 10/2011 | Wu |
| 2014/0050144 A1* | 2/2014 | Ma .................. H04B 7/15542 370/315 |

OTHER PUBLICATIONS

International Search Report and Written Opinion Corresponding to International Application No. PCT/US2013/046325; dated Nov. 14, 2013; 12 Pages.

International Preliminary Report on Patentability Corresponding to International Application No. PCT/US2013/046325; dated Feb. 12, 2015; 9 Pages.

* cited by examiner

```
-- ASN1START
RRCConnectionReconfiguration ::=SEQUENCE {
    rrc - TransactionIdentifier         RRC-TransactionIdentifier,
    criticalExtensions                  CHOICE {
        c1                                  CHOICE{
            rrcConnectionReconfiguration-r8     RRXConnectionReconfiguration-r8-IEs,
            spare7 NULL,
            spare6 NULL, spare5 NULL, spare4 NULL,
            spare3 NULL, spare2 NULL, spare1 NULL
        },
        criticalExtensionsFuture        SEQUENCE {}
    }
}
RRCConnectionReconfiguration-r8-IEs ::=SEQUENCE {
    measConfig                          measConfig                          OPTIONAL,   -- Need ON
    mobilityControlInfo                 MobilityControlInfo                 OPTIONAL,   --Cond HO
    dedicatedInfoNASList                SEQUENCE (SIZE(1..maxDRB)) OF
                                            DedicatedInfoNAS                OPTIONAL,   -- Cond nonHO
    radioResourceConfigDedicated        RadioResourceConfigDedicatedOPTIONAL,           -- Cond HO-toEUTRA
    securityConfigHO                    securityConfigHO                    OPTIONAL,   -- Cond HO
    nonCriticalExtension                RRCConnectionReconfiguration-v890-IEs           OPTIONAL
}
RRCConnectionReconfiguration-v890-IEs ::=SEQUENCE {
    lateNonCriticalExtension            OCTET STRING                        OPTIONAL,   -- Need OP
    nonCriticalExtension                RRCConnectionReconfiguration-v920-IEs           OPTIONAL
}
RRCConnectionReconfiguration-v920-IEs ::=SEQUENCE {
    otherConfig-r9                      OtherConfig-r9                      OPTIONAL,   -- Need ON
    fullConfig-r9                       ENUMERATED {true}                   OPTIONAL,   -- Cond HO-Reestab
    nonCriticalExtension                RRCConnectionReconfiguration-v1020-IEs          OPTIONAL
}
``` to Fig. 12B

FIG. 12A

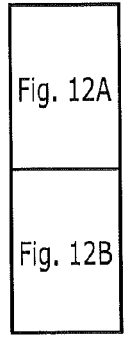

FIG. 12 from Fig. 12A

```
RRCConnectionReconfiguration-v1020-IEs ::=SEQUENCE {
    sCellToReleaseList-r10          SCellToReleaseList-r10        OPTIONAL,  -- Need ON
    sCellToAddModList-r10           SCellToAddModList-r10         OPTIONAL,  -- Need ON
    nonCriticalExtension            SEQUENCE {}                   OPTIONAL-- Need OP
}
SCellToAddModList-r10 ::=       SEQUENCE (SIZE (1..maxSCell-r10)) OF SCellToAddMod-r10
SCellToAddMod-r10 ::=           SEQUENCE {
    sCellIndex-r10                  sCellIndex-r10,
    cellIdentification-r10          SEQUENCE {
        physCellId-r10                  physCellId,
        dl-CarrierFreq-r10              ARFCN-ValueEUTRA
    }                                                             OPTIONAL,  -- Cond SCellAdd
    radioResourceConfigCommonSCell-r10    RadioResourceConfigCommonSCell-r10   OPTIONAL, -- Cond SCellAdd
    radioResourceConfigDedicatedSCell-r10 RadioResourceConfigDedicatedSCell-r10 OPTIONAL, -- Cond SCellAdd2
    ...
}
SCellToReleaseList-r10 ::=      SEQUENCE (SIZE (1..maxSCell-r10)) OF SCellIndex-r10
SecurityConfigHO ::=            SEQUENCE {
    handoverType                    CHOICE {
        intraLTE                        SEQUENCE {
            securityAlgorithmConfig         SecurityAlgorithmConfig   OPTIONAL, -- Cond fullConfig
            keyChangeIndicator              BOOLEAN
            nextHopChainingCount            NextHopChainingCount
        },
        interRAT                        SEQUENCE {
            securityAlgorithmConfig         SecurityAlgorithmConfig,
            nas-SecurityParamToEUTRA        OCTET STRING (SIZE (6) )
        },
    },
    ...
},
-- ASN1STOP
```

FIG. 12B

--ASN1START

```
MobilityControlInfo ::=     SEQUENCE {
    targetPhysCellId            PhysCellId,
    carrierFreq                 CarrierFreqEUTRA            OPTIONAL, -- Cond HO-toEUTRA
    carrierBandwidth            CarrierBandwidthEUTRA       OPTIONAL, -- Cond HO-toEUTRA
    additionalSpectrumEmission  AdditionalSpectrumEmission  OPTIONAL, -- Cond HO-toEUTRA
    t304                        ENUMERATED {
                                    ms50, ms100, ms150, ms200, ms500, ms1000,
                                    ms2000, spare1},
    newUE-Identity              C-RNTI,
    radioResourceConfigCommon   RadioResourceConfigCommon,
    rach-ConfigDedicated        RACH-ConfigDedicated        OPTIONAL, -- Need OP
    ...
}

CarrierBandwidthEUTRA ::=   SEQUENCE {
    dl-Bandwidth                ENUMERATED {
                                    n6, n15, n25, n50, n75, n100, spare10,
                                    spare9, spare8, spare7, spare6, spare5,
                                    spare4, spare3, spare2, spare1},
    ul-Bandwidth                ENUMERATED {
                                    n6, n15, n25, n50, n75, n100, spare10,
                                    spare9, spare8, spare7, spare6, spare5,
                                    spare4, spare3, spare2, spare1} OPTIONAL -- Need OP }
CarrierFreqEUTRA ::=        SEQUENCE {
    dl-CarrierFreq              ARFCN-ValueEUTRA,
    ul-CarrierFreq              ARFCN-ValueEUTRA            OPTIONAL -- Cond FDD
}
```

FIG. 13

WIRELESS NETWORKS, DEVICES AND METHODS THAT ESTABLISH ASYMMETRIC FREQUENCY DIVISION DUPLEX (FDD) LINKS USING A DOWNLINK FREQUENCY CARRIER AND MULTIPLE UPLINK FREQUENCY CARRIERS

TECHNICAL FIELD

Various embodiments described herein relate to radio frequency communications and, more particularly, to wireless communication networks and devices, and methods of operating the same.

BACKGROUND

Wireless communication networks are increasingly being used for wireless communications with various types of wireless user equipment. The wireless network itself may include a plurality of wireless base stations, also commonly referred to as "base stations", "radio access nodes", "RAN nodes", "NodeBs", "eNodeBs" or simply as "nodes", that define a plurality of cells, and a core network that controls the base stations and interfaces the base stations with other wired and/or wireless networks. The nodes may be terrestrial and/or space-based. The nodes communicate with wireless User Equipment (UE), also referred to as "user equipment", "wireless terminals" or "mobile stations" or simply as "terminals", using radio resources that are allocated to the wireless network. The radio resources may be defined in terms of time (for example, in a Time Division Multiple Access (TDMA) system), space (for example, in a Space Division Multiple Access (SDMA) system), frequency (for example, in a Frequency Division Multiple Access (FDMA) system) and/or code (for example, in a Code Division Multiple Access (CDMA) system). The nodes may use licensed and/or unlicensed frequency spectrum. Radio resources may be assigned to UEs by the wireless network upon initial communication and may be reassigned due to, for example, movement of the UEs, changing bandwidth requirements, changing network traffic, dynamic scheduling, UE Quality of Service (QoS), etc.

Many wireless systems, including Long Term Evolution (LTE) wireless systems, establish Frequency Division Duplex (FDD) links composed of paired frequency carriers. The paired spectrum includes a downlink frequency carrier for transmission from a node to user equipment and an uplink frequency carrier that is spaced apart in frequency from the downlink frequency carrier, for transmission from the user equipment to the node, to thereby establish a frequency division duplex communications link between the node and the user equipment. A given user equipment may operate using a single carrier pair comprising a carrier from an uplink frequency band and a carrier from a downlink frequency band, and can be subsequently handed over to another carrier pair using another carrier from the uplink frequency band and the downlink frequency band. Alternatively, the user equipment may communicate using multiple carriers in one or more multiple downlink frequency bands and one or multiple carriers in multiple paired uplink frequency bands.

SUMMARY

Various embodiments described herein can provide a node of a wireless network. The node comprises processor circuitry that is configured to arrange a frequency division duplex communications link from the node to a user equipment using a downlink frequency carrier having a downlink frequency bandwidth, and from the user equipment to the node by selectively using either a first uplink frequency carrier having a first uplink frequency bandwidth or a second uplink frequency carrier that is spaced apart in frequency from the first uplink frequency carrier and having a second uplink frequency bandwidth. More than two uplink frequency carriers may be selectively used in other embodiments. A transceiver is provided that is responsive to the processor circuitry and is configured to communicate with the user equipment over the frequency division duplex communications link by transmitting communications to the user equipment using the downlink frequency carrier, and by selectively receiving communications from the user equipment using either the first uplink frequency carrier or the second uplink frequency carrier. In some embodiments, the downlink frequency bandwidth and the first uplink frequency bandwidth are a same bandwidth and the second uplink frequency bandwidth is different from the downlink frequency bandwidth and the first uplink frequency bandwidth.

In other embodiments, the downlink frequency carrier is a first downlink frequency carrier having a first downlink frequency bandwidth, the frequency division duplex communications link is a first frequency division duplex communications link, and the processor circuitry is further configured to arrange a second frequency division duplex communications link from the node to the user equipment using a second downlink frequency carrier having a second downlink frequency bandwidth, and from the user equipment to the node using a third uplink frequency carrier having a third uplink frequency bandwidth. In these embodiments, the transceiver is further configured to communicate with the user equipment over the second frequency division duplex communications link by transmitting communications to the user equipment using the second downlink frequency carrier and receiving communications from the user equipment using the third uplink frequency carrier.

In some embodiments, the processor circuitry is configured to arrange the frequency division duplex communications link by initially assigning the first uplink frequency carrier to the user equipment and by subsequently selectively handing over the user equipment to the second uplink frequency carrier. Moreover, the transceiver is configured to communicate with the user equipment over the frequency division duplex communications link by transmitting communications to the user equipment using the downlink frequency carrier, by initially receiving communications from the user equipment using the first uplink frequency carrier and by subsequently selectively receiving communications from the user equipment using the second uplink frequency carrier while continuing to transmit communications to the user equipment using the downlink frequency carrier.

In still other embodiments, the processor circuitry is configured to initially assign the first uplink frequency carrier to the user equipment and to subsequently selectively hand over the user equipment to the second uplink frequency carrier, by configuring an initial attachment message for the user equipment that identifies the downlink frequency carrier and the first uplink frequency carrier and by selectively configuring a handover message for the user equipment that continues to identify the downlink frequency carrier but identifies the second uplink frequency carrier. Moreover, the transceiver is configured to initially receive communications from the user equipment using the first uplink frequency carrier and to subsequently selectively receive communications from the user equipment using the second uplink frequency carrier while continuing to transmit communications to the user equipment using the downlink frequency carrier, by transmitting the initial attachment message to the user equipment that identifies the downlink frequency carrier and the first uplink frequency carrier and by selectively transmitting the handover message to the user equipment that continues to identify the downlink frequency carrier but identifies the second uplink frequency carrier.

In some embodiments, the node is included in a Long Term Evolution (LTE) wireless communications system, the attachment message comprises a system information broadcast message that identifies the downlink frequency carrier and the first uplink frequency carrier, and the handover message comprises a mobility control information message that that continues to identify the downlink frequency carrier but identifies the second uplink frequency carrier. The mobility control information message may also identify the downlink frequency bandwidth and the second uplink frequency bandwidth, and continues to identify a same target physical cell for the frequency division duplex communications link.

Moreover, in other embodiments, the processor circuitry is further configured to arrange a plurality of the frequency division duplex communications links between the node and a respective plurality of user equipments, by arranging a first subset of the plurality of frequency division duplex communications links for a corresponding first subset of the user equipments using the downlink frequency carrier and the first uplink frequency carrier and by arranging a second subset of the plurality of frequency division duplex communications links for a corresponding second subset of the user equipments using the downlink frequency carrier and the second uplink frequency carrier. The transceiver is configured to communicate with the first subset of the user equipments using the downlink frequency carrier and the first uplink frequency carrier and with the corresponding second subset of the user equipments using the downlink frequency carrier and the second uplink frequency carrier.

The processor circuitry may be further configured to arrange the plurality of the frequency division duplex communications links between the node and the respective plurality of user equipments, by initially assigning the plurality of frequency division duplex communications links for the plurality of user equipments using the downlink frequency carrier and the first uplink frequency carrier and by subsequently selectively handing over the second subset of the plurality of frequency division duplex communications links for the corresponding second subset of the user equipments using the downlink frequency carrier and the second uplink frequency carrier. The processor circuitry may be still further configured to initially assign the plurality of frequency division duplex communications links for the plurality of user equipments using the downlink frequency carrier and the first uplink frequency carrier by configuring an initial attachment message for the plurality of user equipments that identifies the downlink frequency carrier and the first uplink frequency carrier, and to subsequently selectively hand over the second subset of the plurality of frequency division duplex communications links for the corresponding second subset of the user equipments using the downlink frequency carrier and the second uplink frequency carrier by selectively configuring a handover message for the second subset of the plurality of user equipments that continues to identify the downlink frequency carrier but identifies the second uplink frequency carrier.

In these embodiments, when the node is included in an LTE wireless communications system the attachment message may comprise a system information broadcast message that identifies the downlink frequency carrier and the first uplink frequency carrier, and the handover message may comprise a mobility control information message that that continues to identify the downlink frequency carrier but identifies the second uplink frequency carrier. Moreover, the mobility control information message may also identify the downlink frequency bandwidth and the second uplink frequency bandwidth, and may continue to identify a same target physical cell for the duplex communication link.

Various other embodiments can provide a user equipment of a wireless network. The user equipment may include processor circuitry that is configured to establish a frequency division duplex communications link from a node of the wireless network to the user equipment using a downlink frequency carrier having a downlink frequency bandwidth, and from the user equipment to the node by selectively using either a first uplink frequency carrier having a first uplink frequency bandwidth or a second uplink frequency carrier that is spaced apart in frequency from the first uplink frequency carrier and having a second uplink frequency bandwidth. The user equipment may also include a transceiver that is responsive to the processor circuitry and is configured to communicate with the node over the frequency division duplex communications link by receiving communications from the node using the downlink frequency carrier, and by selectively transmitting communications to the node using either the first uplink frequency carrier or the second uplink frequency carrier. The selection may be made by a scheduler of the node or other system infrastructure.

In some embodiments, the downlink frequency carrier is a first downlink frequency carrier having a first downlink frequency bandwidth, the frequency division duplex communications link is a first frequency division duplex communications link, and the processor circuitry is further configured to establish a second frequency division duplex communications link from the node to the user equipment using a second downlink frequency carrier having a second downlink frequency bandwidth, and from the user equipment to the node using a third uplink frequency carrier having a third uplink frequency bandwidth. Moreover, the transceiver is further configured to communicate with the node over the second frequency division duplex communications link by receiving communications from the node using the second downlink frequency carrier and transmitting communications to the node using the third uplink frequency carrier.

In some embodiments, the processor circuitry is configured to arrange the frequency division duplex communications link by initially using the first uplink frequency carrier and by subsequently using the second uplink frequency carrier. Moreover, the transceiver is configured to communicate with the node over the frequency division duplex communications link by receiving communications from the node using the downlink frequency carrier, by initially transmitting communications to the node using the first uplink frequency carrier and by subsequently transmitting communications to the node using the second uplink frequency carrier while continuing to receiving communications from the node using the downlink frequency carrier.

In some embodiments, the processor circuitry is further configured to initially use the first uplink frequency carrier and to subsequently use the second uplink frequency carrier, by processing initial attachment message for the user equipment that identifies the downlink frequency carrier and the first uplink frequency carrier and by processing a subsequent handover message for the user equipment that continues to identify the downlink frequency carrier but identifies the second uplink frequency carrier. Moreover, when the user equipment is included in an LTE wireless communications system, the attachment message may comprise a system information broadcast message that identifies the downlink frequency carrier and the first uplink frequency carrier and the handover message may comprise a mobility control information message that that continues to identify the downlink frequency carrier but identifies the second uplink frequency carrier. Moreover, the mobility control information message may also identify the downlink frequency bandwidth and the second uplink frequency bandwidth, and may continue to identify a same target physical cell for the frequency division duplex communications link.

Various embodiments described above have focused on a node of a wireless network and a user equipment of a wireless network. However, analogous methods of operating a node of a wireless network and of operating a user equipment of a wireless network may also be provided, according to various embodiments described herein.

For example, a node of a wireless network may be operated by arranging a frequency division duplex communications link from the node to a user equipment using a downlink frequency carrier having a downlink frequency bandwidth, and from the user equipment to the node by selectively using either a first uplink frequency carrier having a first uplink frequency bandwidth or a second uplink frequency carrier that is spaced apart in frequency from the first uplink frequency carrier and having a second uplink frequency bandwidth. Moreover, communications may take place with the user equipment over the frequency division duplex communications link by transmitting communications to the user equipment using the downlink frequency carrier, and by selectively receiving communications from the user equipment using either the first uplink frequency carrier or the second uplink frequency carrier. Various analogous embodiments of operating a node of a wireless network may be provided, as was described above.

Similarly, a user equipment of a wireless network may be operated by establishing a frequency division duplex communications link from a node of the wireless network to the user equipment using a downlink frequency carrier having a downlink frequency bandwidth, and from the user equipment to the node by selectively using either a first uplink frequency carrier having a first uplink frequency bandwidth or a second uplink frequency carrier that is spaced apart in frequency from the first uplink frequency carrier and having a second uplink frequency bandwidth. The user equipment may then communicate with the node over the frequency division duplex communications link by receiving communications from the node using the downlink frequency carrier, and by selectively transmitting communications to the node using either the first uplink frequency carrier or the second uplink frequency carrier. The selection may be made by a scheduler of the node or other infrastructure. Analogous methods for the user equipment may also be provided according to any of the embodiments described above.

BRIEF DESCRIPTION OF THE DRAWINGS

FIGS. 12A and 12B, which collectively form FIG. 12 as illustrated, are an illustration of an RRCConnectionReconfiguration Information Element according to various embodiments described herein.

FIG. 13 is a diagram of a MobilityControlInfo Information Element according to various embodiments described herein.

DETAILED DESCRIPTION

Figure 1:
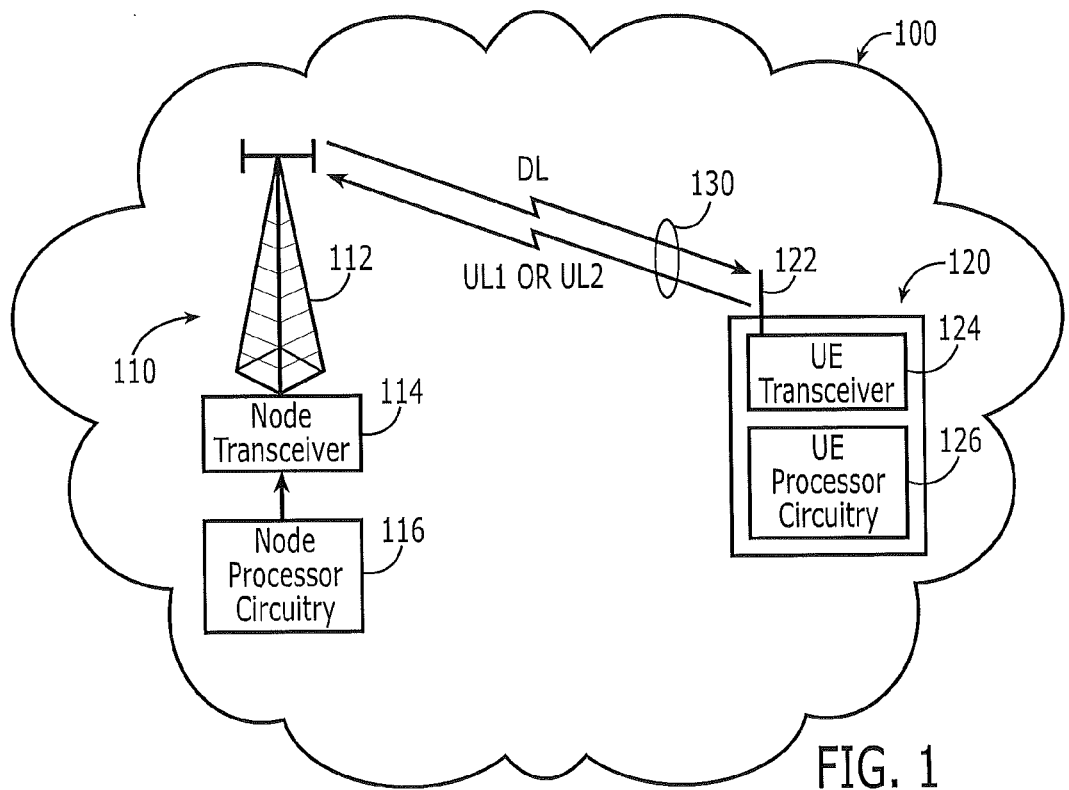
FIGS. 1 and 2 are block diagrams of a wireless network, including devices and operating methods, according to various embodiments described herein.

Various embodiments described herein may arise from recognition that it may be desirable to pair a single downlink frequency carrier with two or more spaced apart uplink frequency carriers to provide a single Frequency Division Duplex (FDD) communications link between a node and a user equipment. This desire may arise because additional uplink frequency spectrum may be available to an operator without the availability of paired downlink spectrum. Such a pairing of a downlink frequency carrier with multiple spaced apart uplink frequency carriers is not generally permitted using carrier aggregation, wherein the number of uplink carriers generally must be equal to or less than the number of downlink carriers. Moreover, the provision of a single downlink carrier and multiple uplink frequency carriers in a single frequency division duplex communications link may increase the complexity of the user equipment and/or the node due to the need to simultaneously communicate on multiple spaced apart uplink carriers.

In sharp contrast, various embodiments described herein allow a frequency division duplex communications link to be provided from the node to a user equipment using a downlink frequency carrier having a downlink frequency bandwidth, and from the user equipment to the node by selectively using either a first uplink frequency carrier having a first uplink frequency bandwidth or a second uplink frequency carrier that is spaced apart in frequency from the first uplink frequency carrier and having a second uplink frequency bandwidth. Communications then take place by transmitting communications from the node to the user equipment using the downlink frequency carrier and by selectively transmitting communications from the user equipment to the node using either the first uplink frequency carrier or the second uplink frequency carrier. Thus, there may be no need to simultaneously communicate on multiple spaced apart uplink carriers, so that the design of the user equipment and/or the node may be simplified.

These frequency division duplex communications may take place by initially assigning the first uplink frequency carrier to the user equipment and by subsequently selectively handing over the user equipment to the second uplink frequency carrier. The selection may be made by a scheduler of the node or other system infrastructure. For example, an initial attachment message for the user equipment identifies the downlink frequency carrier and the first uplink frequency carrier. Selective handover then takes place by selectively configuring a handover message for the user equipment that continues to identify the downlink frequency carrier but identifies the second uplink frequency carrier.

Moreover, when the node is communicating with multiple user equipments, a plurality of frequency division duplex communications links may be arranged between the node and a respective plurality of the user equipments, by arranging a first subset of the plurality of frequency division duplex communications links for a corresponding first subset of the user equipments using the downlink frequency carrier and the first uplink frequency carrier and by arranging a second subset of the plurality of frequency division duplex communications links for a corresponding second subset of the user equipments using the downlink frequency carrier and the second uplink frequency carrier. In some embodiments, this assignment and reassignment may take place without the need to alter LTE standards, by using an attachment message that comprises a system information broadcast message that identifies the downlink frequency carrier and the first uplink frequency carrier and by using a handover message that comprises a mobility control information message that continues to identify the downlink frequency carrier but identifies the second uplink frequency carrier.

FIG. 1 is a simplified block diagram of a wireless network and operating methods, including a node and a User Equipment (UE) according to various embodiments described herein. The wireless network 100 is shown in simplified form as including a single node 110 and UE 120. However, in real world networks, many nodes 110 and many UEs 120 may be provided. The node 110 includes one or more antennas 112, a node transceiver 114 and node processor circuitry 116, and may include many other systems and components to carry out other node functionality. The UE 120 includes one or more UE antennas 122, a UE transceiver 124, and UE processor circuitry 126, and may also include many other components to carry out other UE functionality.

As illustrated in FIG. 1, the node processor circuitry 116 is configured to arrange an FDD communications link 130 from the node 110 to the UE 120 using a downlink frequency carrier DL having a downlink frequency bandwidth, and from the UE 120 to the node 110 by selectively using either a first uplink frequency carrier UL1 having a first uplink frequency bandwidth or a second uplink frequency carrier UL2 that is spaced apart in frequency from the first uplink frequency carrier UL1 and having a second uplink frequency bandwidth UL2. The node transceiver 114 is responsive to the node processor circuitry 116, and is configured to communicate with the UE 120 over the FDD communications link 130, by transmitting communications to the UE using the downlink frequency carrier DL and by receiving communications from the UE by selectively using either the first uplink frequency carrier UL1 or the second uplink frequency carrier UL2. More than two uplink frequency carriers may be selectively used in other embodiments.

Moreover, the UE processor circuitry 126 is also configured to establish the FDD communications link 130 from the node 110 to the UE 120 using the downlink frequency carrier DL having the downlink frequency bandwidth, and from the UE 120 to the node 110 by selectively using either the first uplink frequency carrier UL1 or the second uplink frequency carrier UL2. The UE transceiver 124 is responsive to the UE processor circuitry 126 and is configured to communicate with the node 110 over the FDD communications link 130, by receiving communications from the node 110 using the downlink frequency carrier DL and by selectively transmitting communications to the node using either the first uplink frequency carrier UL1 or the second uplink frequency carrier UL2.

In some embodiments, DL, UL1 and UL2 may all have the same bandwidths, or two or more of these frequency carriers may have different bandwidths. Specifically, in some embodiments, DL and UL1 have the same bandwidth, whereas UL2 has a different bandwidth than DL and UL1.

Figure 2:
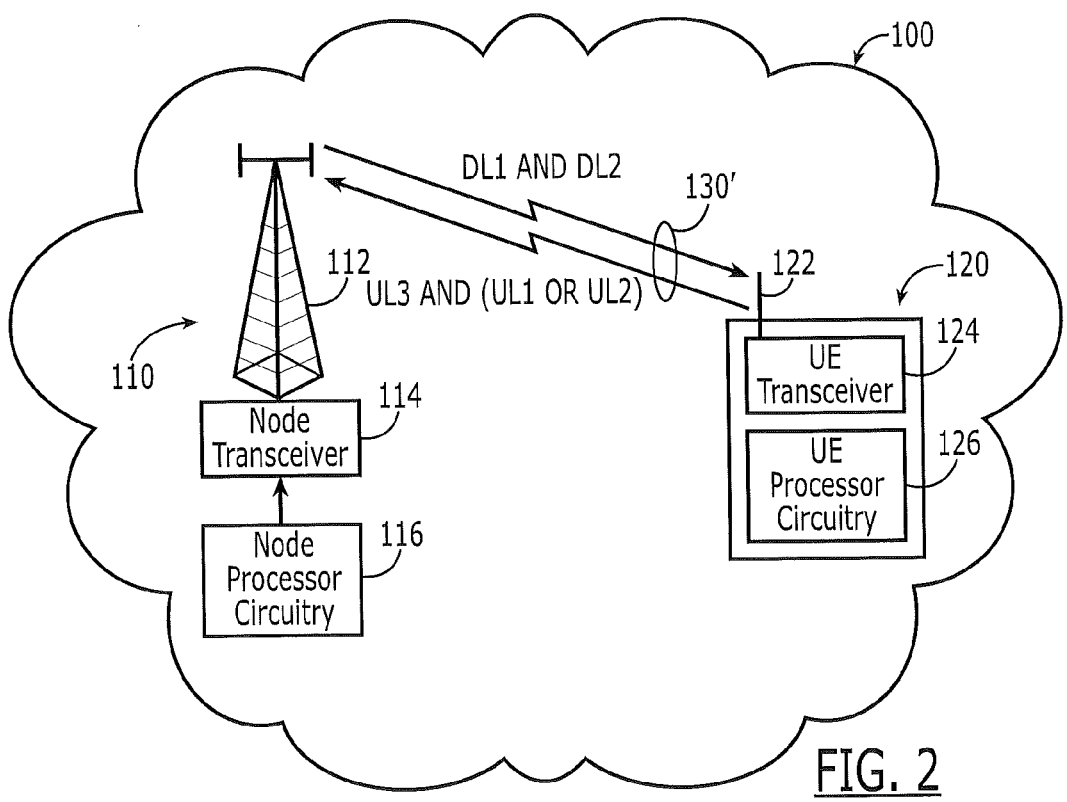

Various embodiments of FIG. 1 may be combined with a paired second downlink frequency carrier and third uplink frequency carrier. Accordingly, as shown in FIG. 2, an FDD communications link 130' may include the downlink frequency carrier (now labeled DL1) and a second downlink frequency carrier DL2, and the uplink may include a third uplink frequency carrier UL3 and either the first uplink frequency carrier UL1 or the second uplink frequency carrier UL2. Accordingly, the node transceiver 114, the node processor circuitry 116, the UE transceiver 124 and the UE processor circuitry 126 may be configured to arrange an FDD link 130 that includes DL1 and DL2, and UL3 and (UL1 or UL2). Two different FDD links may also be provided according to other embodiments, where one FDD link uses DL2 and UL3, and the other FDD link uses DL1 and either UL1 or UL2.

Figure 3A:
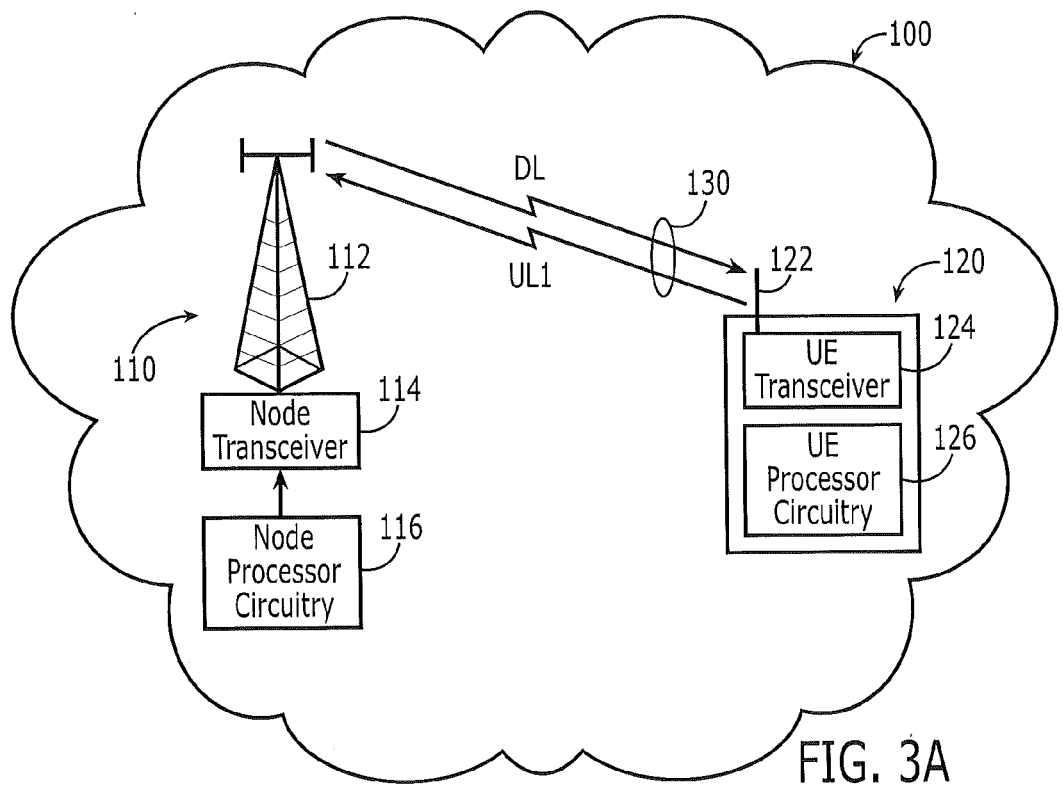
FIGS. 3A and 3B are block diagrams of a wireless network, including devices and operating methods, at two different times according to various embodiments described herein.
Figure 3B:
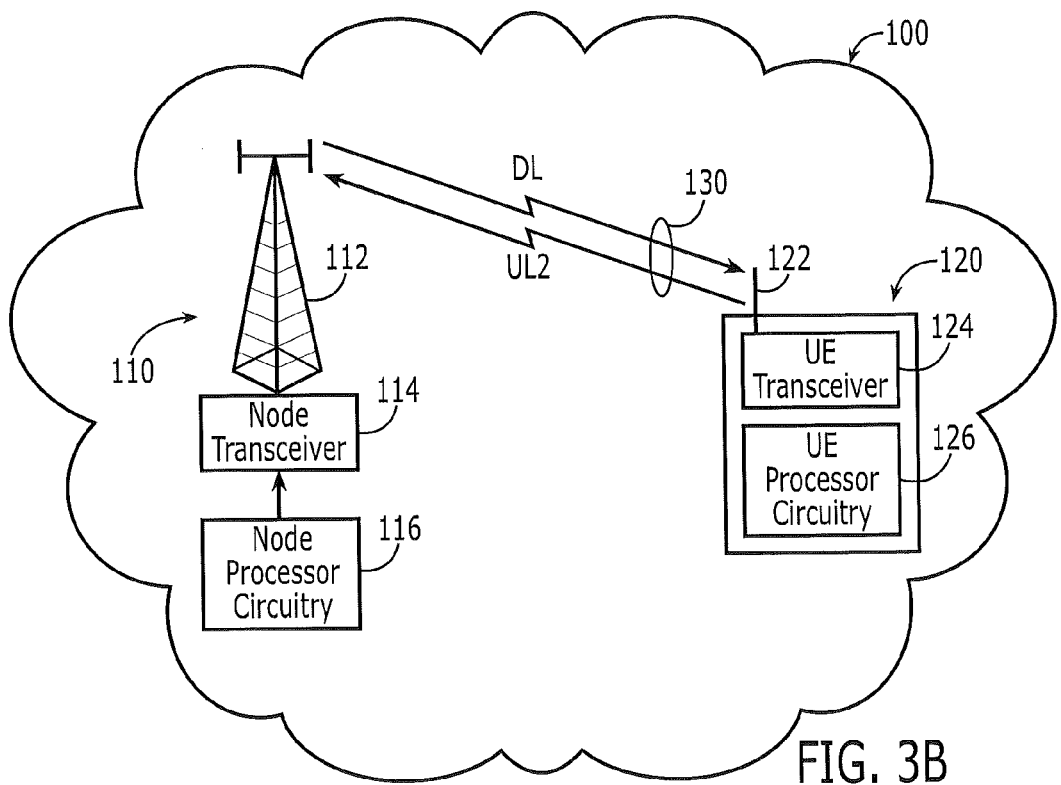

FIGS. 3A and 3B illustrate the systems, methods and devices of FIG. 1 at two different points in time. As shown in FIG. 3A, at a first point in time, the FDD communications link 130 is arranged by initially assigning the downlink frequency carrier DL and the first uplink frequency carrier UL1. Then, as shown in FIG. 3B, at a subsequent point in time, a handover takes place from UL1 to UL2, while retaining DL1 in the FDD communications link 130. This handover may be selective, in that it may be controlled by the node 110 and/or the wireless communications system 100 based on load balancing, channel characteristics and/or other criteria that may be used by a scheduler of the node 110 and/or the wireless communications system 100. Thus, FIG. 3A illustrates the node processor circuitry 116 and the UE processor circuitry 126 being configured to arrange the FDD link 130 by initially assigning the DL and UL1 to the user equipment, and FIG. 3B illustrates subsequently selectively handing over UE 120 to UL2, while continuing to use DL in the FDD link 130.

Initial assignment and handover, as illustrated in FIGS. 3A and 3B, respectively, may be accomplished by configuring an initial attachment message for the UE that identifies the downlink frequency carrier DL and the first uplink frequency carrier UL1, and by selectively configuring a handover message for the UE 120 that continues to identify the downlink frequency carrier DL, but identifies the second uplink frequency carrier UL2. When the wireless system is an LTE wireless communication system, the attachment message may comprise a system information broadcast message that identifies the downlink frequency carrier DL and the first uplink frequency carrier UL1, and the handover message may comprise a mobility control information message that continues to identify the downlink frequency carrier DL but identifies the second uplink frequency carrier UL2. The mobility control information message may also identify the downlink frequency bandwidth and the second uplink frequency bandwidth, and continue to identify a same target physical cell (i.e., the same node 110) for the FDD link 130, so that handover to a different node is not provided. By allowing the UE to initially camp on UL1 and DL as part of an initial attachment message, and then by selectively causing a handover to UL2 while remaining on DL, various embodiments described herein may be provided without the need to change the LTE standard messages. Various embodiments that use LTE will be described in greater detail below.

Figure 4A:
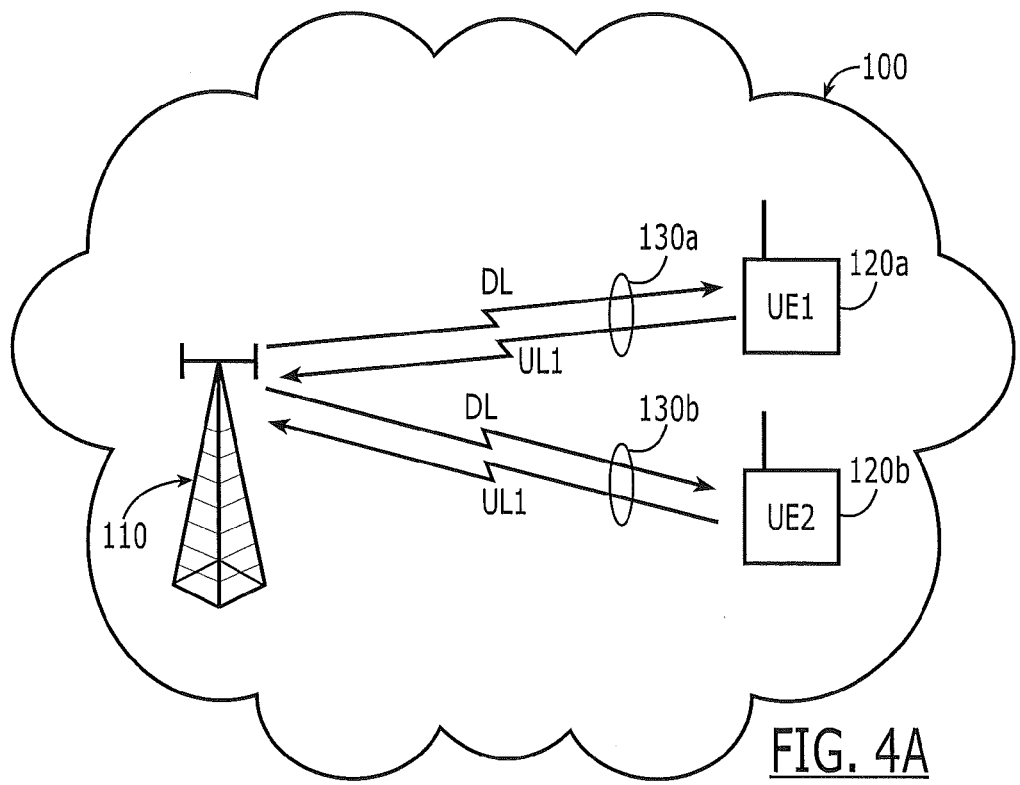
FIGS. 4A and 4B are block diagrams of a wireless network, including devices and operating methods, at two different times according to various other embodiments described herein.
Figure 4B:
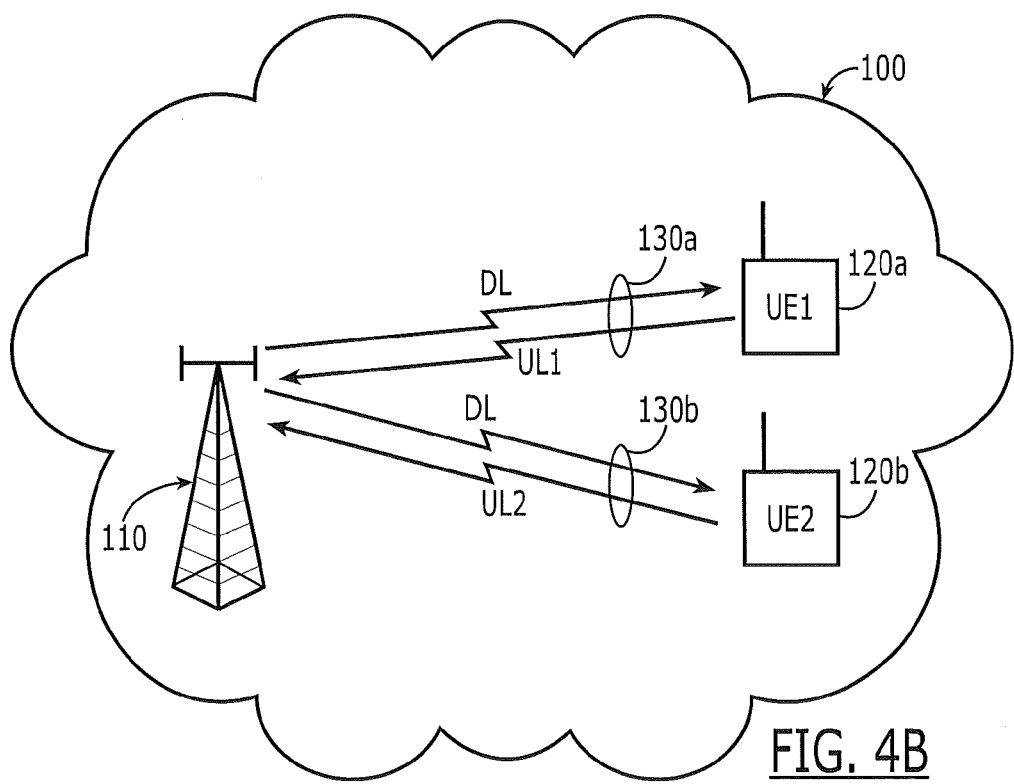

FIGS. 3A and 3B illustrated various embodiments from the perspective of a single UE 120 that communicates with a node 110. However, there may be many UEs that communicate with a node. FIGS. 4A and 4B illustrate various embodiments from the perspective of a node 110 communicating with a plurality of UEs including a first subset of UEs 120a and a second subset of UEs 120b. In FIG. 4A, only two UEs 120a and 120b are illustrated. However, it will be understood that the first subset of UEs 120a may include many UEs, and the second subset of UEs 120b may include many UEs. Moreover, more than two uplink carriers may be selectively used so that more than two subsets of UEs may be provided.

Referring now to FIG. 4A, a plurality of FDD links 130a-130b are provided between the node 110 and a respective plurality of UEs 120a and 120b. As shown in FIG. 4A, the plurality of FDD links 130a, 130b between the node 110 and the respective plurality of UEs 120a, 120b is initially arranged by initially assigning all of the FDD communications links 130a, 130b using the downlink frequency carrier DL and the first uplink frequency carrier UL1. Subsequently, as shown in FIG. 4B, a selective handover takes place for the second subset of UEs 120b to use FDD links 130b comprising the downlink frequency carrier DL and the second uplink frequency carrier UL2. Accordingly, as shown in FIG. 4A, all of the UEs 120a, 120b initially camp on the first uplink frequency carrier UL1. Later, based on capacity, channel quality and/or other factors, a first subset of the UEs 120a remains on DL and UL1, but a second subset of the UEs 120b is handed over to UL2 while remaining on DL. By initially assigning all UEs to the same uplink carrier (for example UL1), and then by selectively handing over some of the UEs to another uplink carrier (for example UL2), initial assignment and handover may both take place without the need to change a standard communications protocol, such as LTE protocols. Thus, standard LTE messages may be used. For example, all of the UEs 120a and 120b may be initially assigned to DL and UL1 using an initial attachment message that identifies DL and UL1. Selective handover may then take place by selectively configuring a handover message for the second subset 120b of the UEs that continues to identify DL, but now identifies UL2. The attachment message may comprise a system information broadcast message that identifies DL and UL1, and the handover message may comprise a mobility control information message that continues to identify the DL, but identifies UL2 rather than UL1. The mobility control information message may also identify the downlink frequency bandwidth and the second uplink (UL2) frequency bandwidth, and may continue to identify a same target physical cell (corresponding to the node 110) for the FDD communications link 130b. Additional LTE embodiments will be described in greater detail below.

Figure 5:
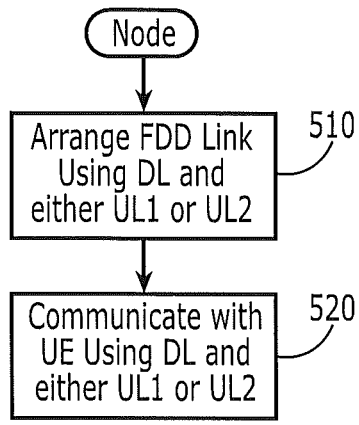
FIG. 5 is a flowchart of operations that may be performed by a node according to various embodiments described herein.

FIG. 5 is a flowchart illustrating operations that may be performed by a node, such as node 110 of FIGS. 1-4B. Referring to FIG. 5, at Block 510, the node, for example the node processor circuitry 116, arranges an FDD link, such as FDD link 130, using DL and either UL1 or UL2. Then, at Block 520, the node transceiver 114 communicates with the UE, such as UE 120, using DL and either UL1 or UL2. More than two uplink frequency carriers may be selectively used in other embodiments.

Figure 6:
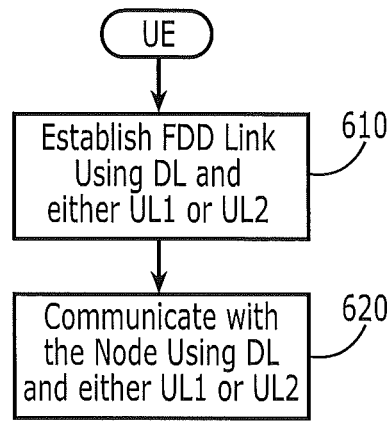
FIG. 6 is a flowchart of operations that may be performed by a user equipment according to various embodiments described herein.

FIG. 6 is a flowchart of operations that may be performed by a UE, such as the UE 120, 120a or 120b of FIGS. 1-4B. Referring to FIG. 6 at Block 610, an FDD link is established, for example by the UE processor circuitry 126, using DL and either UL1 or UL2. Then, at Block 620, communications are provided with the node, such as the node 110, for example using the UE transceiver 124 using DL and either UL1 or UL2. More than two uplink frequency carriers may be selectively used in other embodiments.

Figure 7:
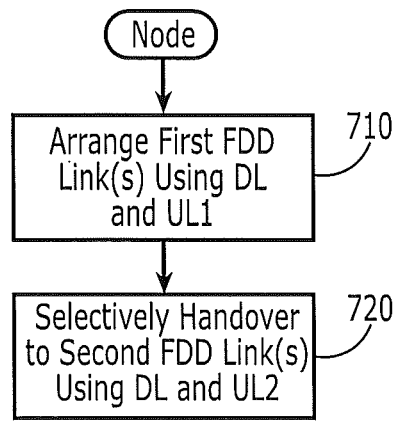
FIG. 7 is a flowchart of operations that may be performed by a node according to various other embodiments described herein.

FIG. 7 is a flowchart of operations that may be performed by a node, such as the node 110 of FIGS. 3A, 3B, 4A and 4B. Specifically, at Block 710, one or more first FDD links 130 of FIG. 3A or 130a and 130b of FIG. 4A, are arranged using DL and UL1. Subsequently, at Block 720, as illustrated in FIGS. 3B and 4B, selective handover takes place to second FDD links 130 and 130b using DL and UL2. More than two uplink frequency carriers may be selectively used in other embodiments.

Figure 8:
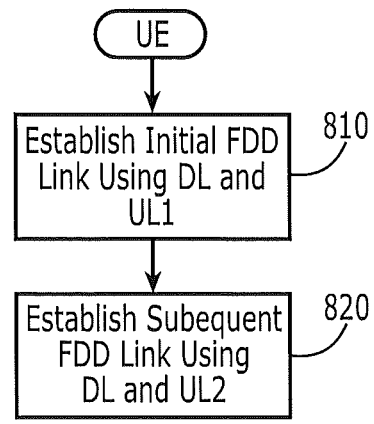
FIG. 8 is a flowchart of operations that may be performed by a user equipment according to various other embodiments described herein.

FIG. 8 is a flowchart illustrating analogous operations for a user equipment 120, 120a, 120b of FIGS. 3A, 3B, 4A and 4B. Referring now to FIG. 8, at Block 810, an initial FDD link is established using DL and UL1, as was illustrated in FIGS. 3A and 4A. Then, at Block 820, subsequent FDD links using DL and UL2 are established based on receipt of a handover command, as was illustrated in FIGS. 3B and 4B. More than two uplink frequency carriers may be selectively used in other embodiments.

Additional discussion of various embodiments will now be provided. These embodiments will be described within the context of a specific plans of a wireless operator, referred to herein as "Operator", and will be described using specific frequency carriers and an LTE network. It will be understood, however, that these embodiments are merely illustrative, and various embodiments described herein may be used with different operators, different frequency carriers, and different communications networks.

Various embodiments described herein may provide solutions for an Asymmetric FDD LTD network where the number of frequency carriers in the downlink and uplink are different. The concept of asymmetric FDD has been introduced in the past, where, for example, different numbers of uplink and downlink carriers may be used to accommodate, for example, asymmetric data requirements for clicks and downloads. However, such embodiments of asymmetric FDD do not appear to use different numbers of uplink and downlink carriers, and carrier aggregation in LTE does not appear to presently provide for different numbers of uplink and downlink carriers.

Assume the Operator plans to launch a nationwide 4G LTE terrestrial network, which may include an Ancillary Terrestrial Component (ATC). The frequency plan for the ATC deployment may evolve in three phases, as defined by the example of Table 1. The plan may include a leased or otherwise acquired extra 5 MHz channel bandwidth (BW) in the same band (L-band) to use for uplink transmission. This extra 5 MHz may be available in the same timeframe as a Phase 2B spectrum plan is deployed. Table 1 describes possible Operator spectrum plans for its different deployment phases. In Table 1, all values are in MHz.

TABLE 1

|    | BW | Center | Low | High |
|----|----|--------|-----|------|
| Phase 0 | | | | |
| DL | 5 | 1552.7 | 1550.2 | 1555.2 |
| UL | 5 | 1654.2 | 1651.7 | 1656.7 |
| Phase 1A | | | | |
| DL | 5 | 1552.7 | 1550.2 | 1555.2 |
| UL | 5 | 1654.2 | 1651.7 | 1656.7 |
| DL | 5 | 1528.8 | 1526.3 | 1531.3 |
| UL | 5 | 1630.3 | 1627.8 | 1632.8 |
| Phase 2B | | | | |
| DL | 10 | 1531 | 1526 | 1536 |
| UL | 10 | 1632.5 | 1627.5 | 1637.5 |
| DL | 10 | 1550.5 | 1545.5 | 1555.5 |
| UL | 10 | 1651.7 | 1646.7 | 1656.7 |
| Leased UL | | | | |
| UL | 5 | 1672.5 | 1670 | 1675 |

Two types of multicarrier technologies are generally supported by LTE: In a first, the node or Base Station (BS) transmits and receives in multiple carriers simultaneously. Each device (UE) can communicate over one carrier at any moment in time, but can handover from one carrier to another. In a second, both BS and device can communicate on multiple carriers simultaneously. This is referred to as "carrier aggregation". This includes the former case, where a BS directs devices to handover from one carrier to another.

Carrier aggregation is part of 3GPP LTE Release 10 and beyond (LTE-Advanced, or LTE-A). The timeline for implementation and delivering the associated products is not presently clear. Moreover, LTE-A carrier aggregation does not presently support the case where the number of UL carriers is greater than the number of DL carriers. This is clearly in conflict with the above described Operator's potential use, where two DL component carriers and three UL component carriers may need to be supported.

Figure 9:
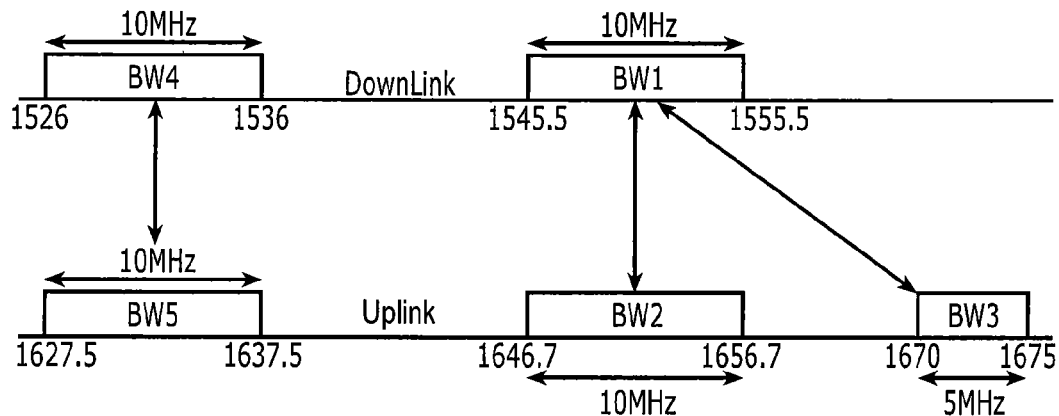
FIG. 9 is a diagram of uplink and downlink carriers that may be used by a wireless system according to various embodiments described herein.

FIG. 9 illustrates an example spectrum plan demonstrated in Table 1. Here, the additional 5 MHz uplink (identified as "BW3") is coupled with 10 MHz DL channel BW (identified as BW1). Another 10 MHz UL channel BW (identified as BW2) is also coupled with BW1. One can say that BW2 and BW3 are tethered to each other as shown in FIG. 9, and devices can move from one to another using the inter-frequency handover (inter-FA HO) process controlled by the node. It should also be possible to tether the additional 5 MHz uplink to the lower 10 MHz wide FDD LTE channel, and the choice of which FDD channel to tether to shall be made through operations control. Note that FIG. 9 is but one example of such deployment, according to various embodiments described herein. However, other embodiments can be applied to any such scenario, regardless of the carrier frequencies.

It will be understood that BW1 of FIG. 9 may be analogized to DL of FIGS. 1, 3A, 3B, 4A and 4B. Moreover, BW2 may be analogized to UL1 of FIGS. 1-3A and 4A-4B. BW3 may be analogized to UL2 of FIGS. 1, 2, 3B and 4B. Finally, BW4 may be analogized to DL2 of FIG. 2, and BW5 may be analogized to UL3 of FIG. 2.

LTE Releases 8 and 9 are vague in supporting asymmetric FDD. It is desirable to support extra bandwidth, such as BW3 of FIG. 9, without modification of the standards. Thus, so-called "legacy devices" (those which are already deployed) would not need any modification. Various embodiments described herein can allow BW3 to be supported by the legacy devices, while no change in the standard is required. Various embodiments described herein may need some modification on the infrastructure side, for example to provide scheduling for the selective handover of the UL. Note that it may be assumed that the hardware of the legacy devices is capable of transmitting in both 10 MHz and 5 MHz (but not necessarily simultaneous transmission), and includes a separate transmit chain including a post-selector filter (but may not include a duplexer). Moreover, the legacy hardware is assumed to be capable to switch and re-tune between these two carriers fast and efficiently. Legacy UEs may have to follow and support fast and efficient inter-carrier handover directed by a node, as well.

A major compatibility problem may arise when control information, such as ACK/NACK information for link adaptation, uplink power control, and uplink resource allocation messages are considered. For example, DL Control information addressing the two UL channel BWs may have to be multiplexed into the same downlink control channel, which is not necessarily defined or allowed by the LTE standard. The changes go down to the modem ASIC/DSP in the node and in the UE. However, various embodiments described herein can provide solutions that need not require a change to the LTE standards.

A conventional LTE uplink scheduling will now be described. During the attachment process, a UE receives broadcast information from a node that determine the basic configuration and functionalities of the UE. That information is categorized into Master Information Block (MIB), System Information Block 1 (SIB1), System Information Block 2 (SIB2), SIB3, etc. MIB is transmitted in the middle 72 subcarriers and, therefore, regardless of the DL transmission bandwidth, the device can receive the information even before identifying the DL channel bandwidth. It contains physical layer information, including fields for the physical layer parameters like downlink bandwidth, number of MIMO Tx antennas, and reference signals included in PHICH Configuration.

After receiving the MIB and realizing the DL channel bandwidth, the UE can receive the SIB1 and SIB2. These messages are broadcast by the node on PDSCH and used by the UE for cell selection. The scheduling and location of SIB2 is based on a node scheduling decision and is not fixed. SIB2 includes two fields that identify the location and bandwidth of the UL carrier. They are: UL-EARFCN, in the case of FDD, indicating the UL LTE carrier frequency; and UL-Bandwidth, in the case of FDD, indicating the UL LTE frequency bandwidth.

Figure 10:
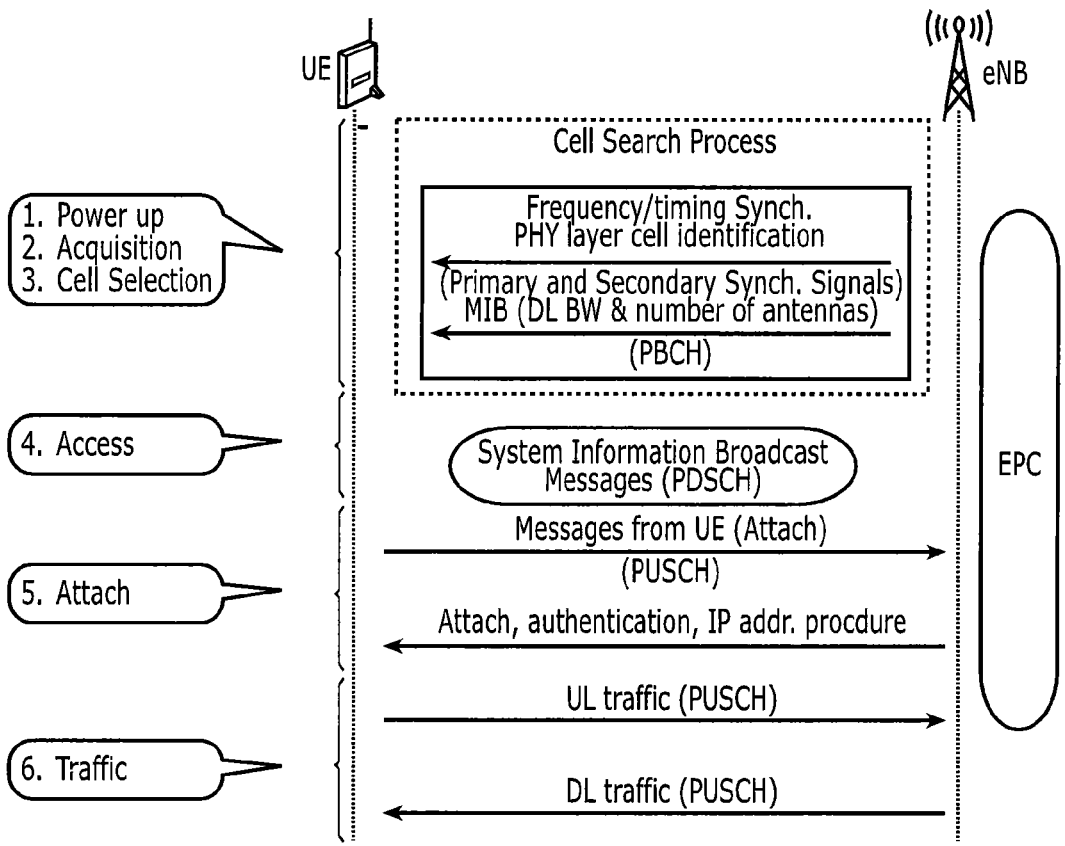
FIG. 10 is a flow diagram of an LTE network entry process according to various embodiments described herein.

FIG. 10 depicts the network entry process used by LTE UEs according to an LTE standard. During the access process, the UE detects and synchronizes itself to the DL carrier, including the receipt of MIB and System Information Blocks (SIBs), in which the information regarding the UL carrier (UL-EARFCN, and UL-Bandwidth) are communicated to the UE through the broadcast messages. Since SIB2 is broadcast to all UEs in DL bandwidth BW1, and only one UL-EARFCN and UL-Bandwidth is included in SIB2, all UEs start UL transmission in the same UL bandwidth.

Figure 11:
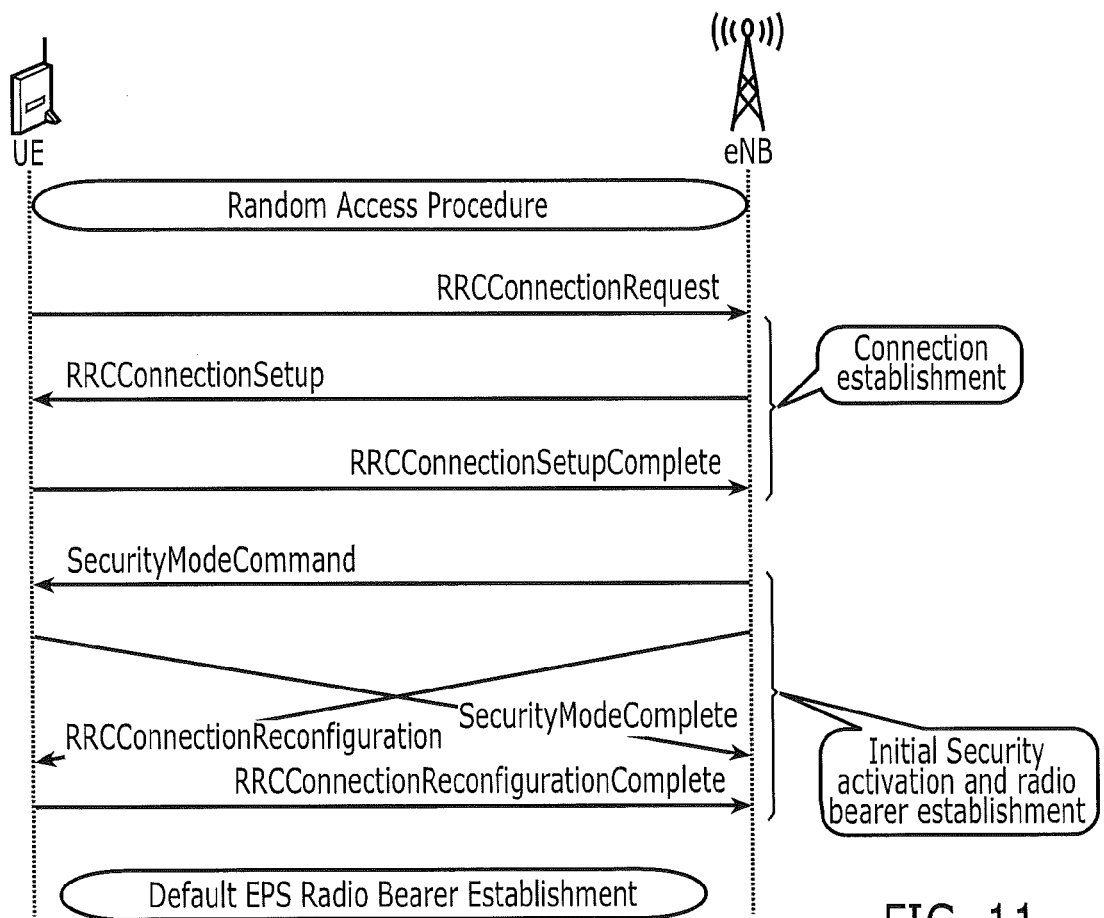
FIG. 11 is a flow diagram of LTE connection establishment according to various embodiments described herein.

During the attach process, the UE synchronizes itself to the UL bandwidth, including Random Access (RACH), authentication, IP address allocation, the process of establishment of RRC connection and establishment of Radio Bearers. At this point, the UE can start UL and DL traffic sessions. FIG. 11 depicts the RRC connection establishment process according to an LTE standard.

The last step of UE attach process is the exchange of RRCConnectionReconfiguration and RRCConnectionReconfigurationComplete message between the node and UE. In FIGS. 12A and 12B, the contents of the RRCConnectionReconfiguration message are shown. One of the fields included in this message is the optional field called MobilityControlInfo. This field is used to send a handoff command (HO Command) to the UE. FIG. 13 depicts the contents of MobilityControlInfo message. This message is used to communicate target UL and DL carrier EARFCN, and bandwidth to the UE.

Applying the UE attach process to various embodiments described herein, assume UE number 1 (UE1) corresponding to UE 120*a*, is planning to camp in BW2 (corresponding to UL1), and UE number 2 (UE2), corresponding to UE 120*b* is planning to camp in BW3 (corresponding to UL2) for UL.

One of the two UL carriers must be selected to be broadcast in SIB2. This is the carrier in which all UEs (UE1 and UE2 or 120*a* and 120*b*) enter into the network. Since all users must be admitted in this UL carrier, it may be more appropriate to select the UL carrier with larger bandwidth for this purpose, if the UL carriers are not equal in bandwidth. In this case, assume that BW2 (UL1) is selected for this purpose.

After establishing the RRC connection (as in FIG. 11), UE1 120*a* continues the normal network entry process as depicted in FIGS. 10 and 11. However, after UE2 120*b* completes the process of RRC connection establishment, the node includes a MobilityControlInfo Information Element in the RRCConnectionReconfiguration Message, where the characteristic of the new carrier (BW1 (DL) as downlink and BW3 (UL2) as uplink) is included. This requires UE2 to perform an intra-cell, inter-carrier handover. The node has to set the targetPhysCellId field within MobilityControlInfo message equivalent to its own Cell ID. UE2 is required to re-establish PDCP for all Radio Bearers that are established, and re-establish Radio Link Layer for all Radio Bearers that are established. However, since the DL carrier has not changed, UE2 is not required to re-synchronize to the DL carrier BW1.

Accordingly, in FIG. 13, the top portion of the information element (MobilityControlInfo) need not be changed. However, the bottom portion of the element (CarrierBandwidthEUTRA and CarrierFreqEUTRA) identifies the same downlink bandwidth DL, but is changed to identify the changed uplink bandwidth UL2, and to identify the same downlink carrier frequency and the new uplink carrier frequency. Thus, receipt of the mobility control information element of FIG. 12 will trigger a handover of the uplink from UL1 to UL2, while retaining the downlink DL, and without transferring to a new cell (because the fields in the top portion of FIG. 13 remain the same).

Note that MobilityControlInfo may only be included in RRCConnectionReconfiguration when AS-security has already been activated, and Signal Radio Bearer 2 (SRB2) with at least one Data Radio Bearer (DRB) is setup and not suspended. SRB0, SRB1, and SRB2, along with one DRB could be included in the message RadioResourceConfigDedicated, that is communicated through the RRC Connection establishment process (RRCConnectionSetup message). If RRCConnectionSetup only sets up SRB0, then the default signaling and Data Radio bearer establishment (SRB1, SRB2, and DRB) could be included in the first exchange of RRCConnectionReconfiguration messages. In this case, a new set of RRCConnectionReconfiguration messages may be needed to carry MobilityControlInfo.

Figure 14:
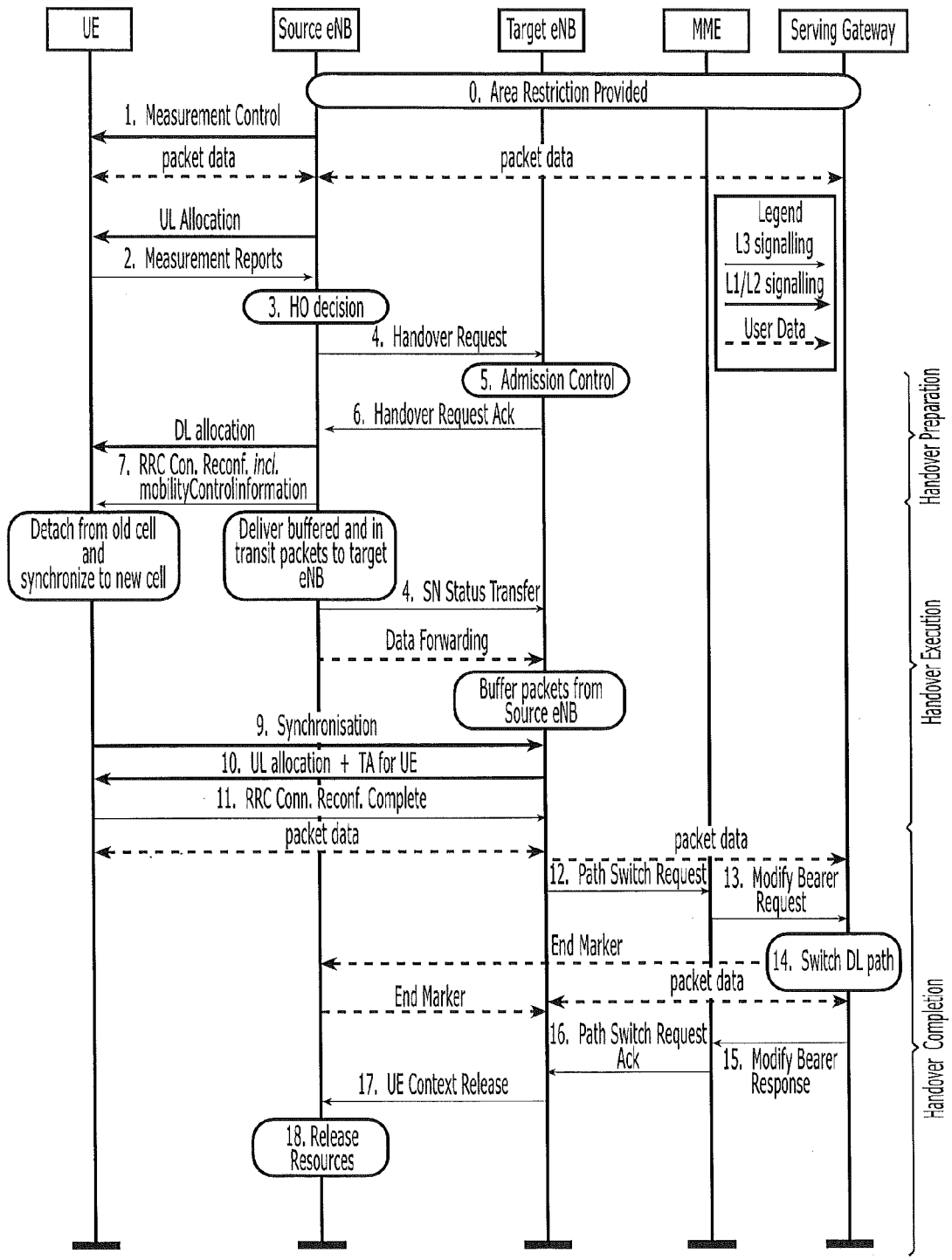
FIG. 14 is a flow diagram of an LTE handoff process according to various embodiments described herein.
Figure 15:
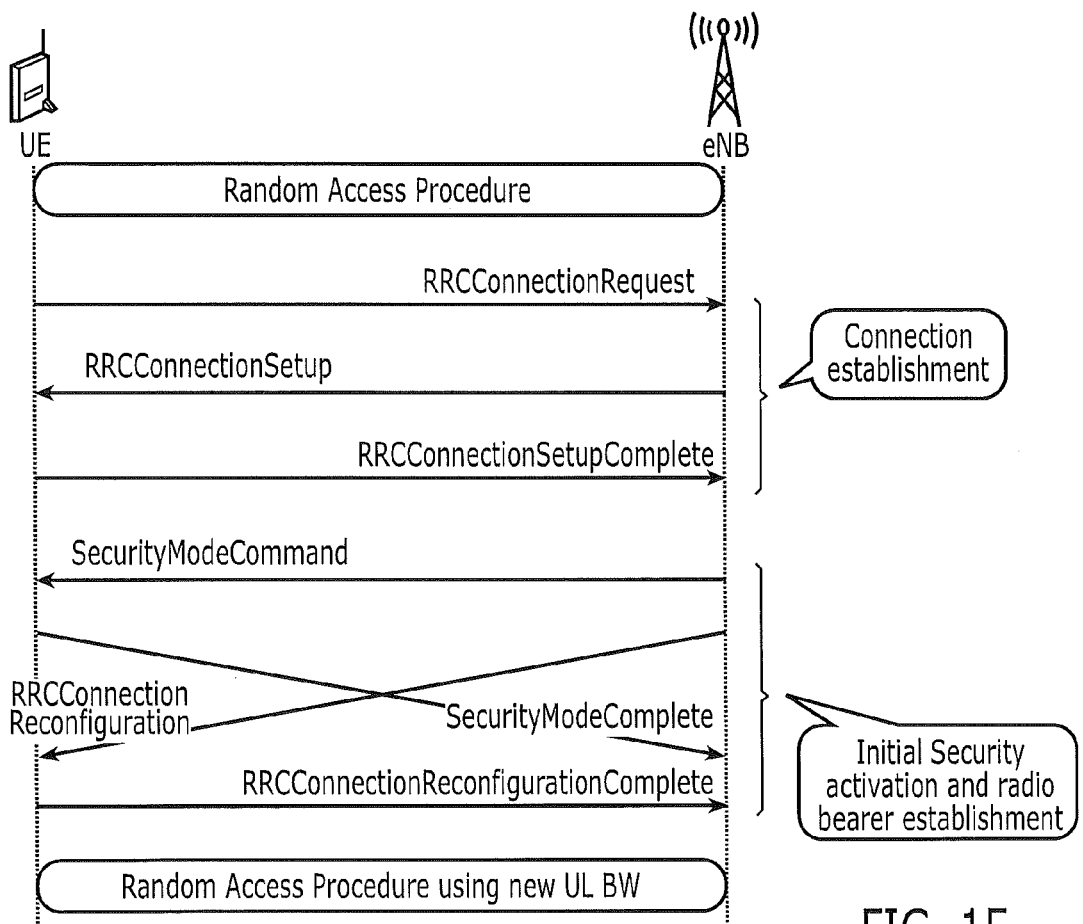
FIG. 15 is a flow diagram of an LTE entry process for a first user equipment according to various embodiments described herein.
Figure 16:
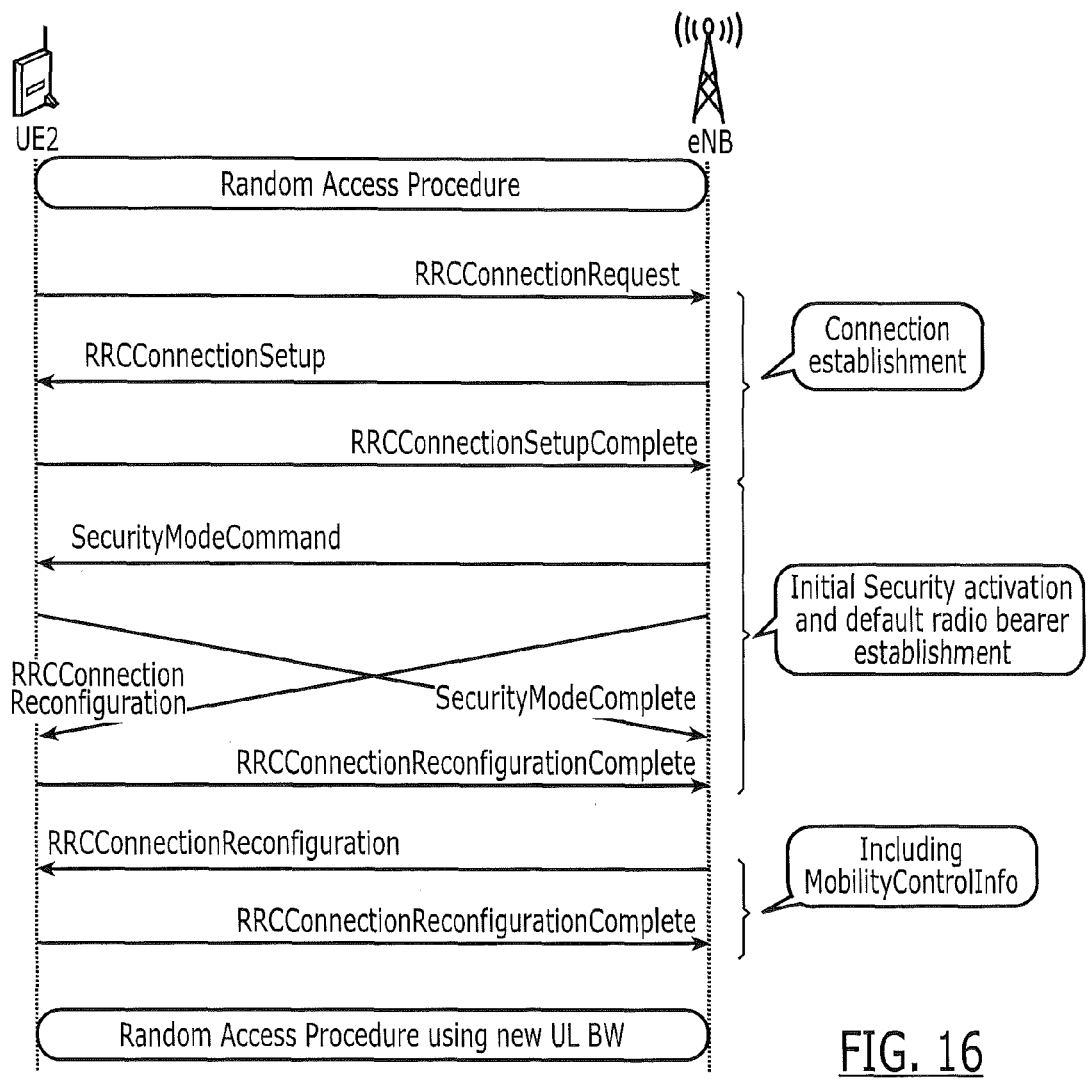
FIG. 16 is a flow diagram of an LTE entry process for a second user equipment according to various embodiments described herein.

This RRCConnectionReconfiguration message including the MobilityControlInfo information element, plays the role of HO command message as in FIG. 14. UE2 needs to re-synchronize to the UL carrier BW3 using the Random Access Process, and then RRCConnectionReConfigurationComplete, playing the role of "HO Complete". FIG. 15 depicts the process signaling chart assuming that the first RRCConnectionSetup message establishes default radio bearers. Alternatively, FIG. 16 depicts the process signaling chart, assuming that the first RRCConnectionSetup message does not establish default radio bearers.

At this time, UE2 is attached to the network, using BW3 (UL2) as the UL carrier. As a result, the node does not need to identify the UL channel BW in the PDCCH, when scheduling the UL BW allocations neither for UE number 1 (using BW2) nor UE number 2 (using BW3). LTE standards, therefore, need not be changed.

Various embodiments described herein may be embodied by modifying a scheduler that functionally may be considered as part of the node processor circuitry 116, and/or may be included in other wireless system infrastructure. Some vendors use a separate baseband channel card for each carrier (pair of carriers in case of FDD), and some vendors use the same channel card, using multiple signal processor modules and schedulers for each carrier. In either case, each carrier has its own scheduler, and the DL and UL allocation is specified in its associated PDCCH in the DL. The DL Control Information (DCI) is sent on PDCCH which contains DL/UL scheduling information, or UL power control commands.

Various embodiments described herein can provide a central scheduler within the node that is aware of both UL bandwidths BW2 (UL1) and BW3 (UL2), and can jointly schedule the UEs 120*a* and 120*b* on both bandwidths. How this central scheduler is developed may depend on particular implementation of multicarrier systems in nodes. One embodiment is depicted in FIG. 17.

Figure 17:
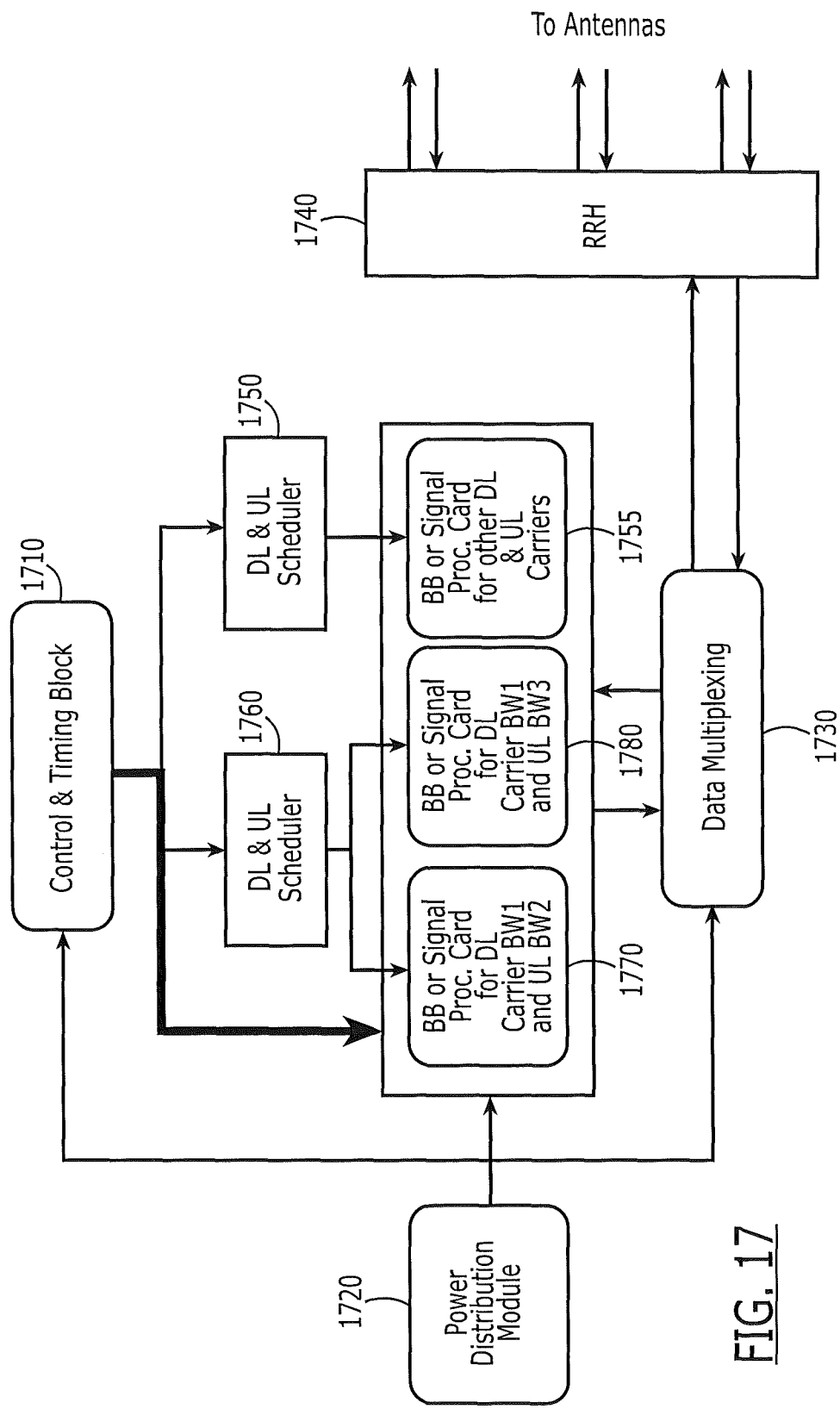
FIG. 17 is a block diagram of a central scheduler that may be included in a node according to various embodiments described herein.

Referring now to FIG. 17, the central scheduler may include a conventional control and timing block 1710, power distribution module 1720, data multiplexing module 1730 and Radio Remote Head (RRH) 1740 that includes filters, power amplifiers, etc. Moreover, if paired carriers, such as DL2 and UL3 of FIG. 2 (or BW4 and BW5 of FIG. 9) are included, a separate uplink and downlink scheduler 1750 and baseband or signal processing card 1755 may be included for these paired carriers. A separate downlink and uplink scheduler 1760 may also be provided according to various embodiments described herein, to allow scheduling between UL1 and UL2 of FIG. 1, or between BW2 and BW3 of FIG. 9. This scheduler 1760 can jointly schedule between these uplink carriers considering load balancing, channel quality and/or other considerations. Separate baseband or signal processing cards 1770 or 1780 may then be provided, for the combination of BW1 and BW2, or BW1 and BW3. In other embodiments, a single uplink and downlink scheduler may schedule all the available uplink and downlink carriers.

Figure 18:
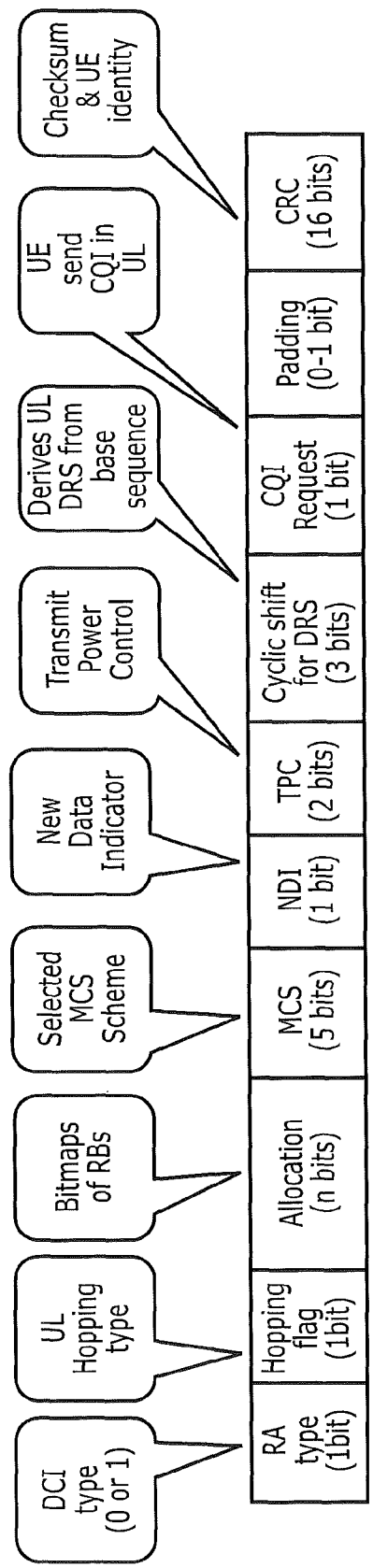
FIG. 18 is a block diagram of a DCI format 0 message for an uplink allocation according to various embodiments described herein.

Thus, various embodiments described herein may provide a central scheduler that observes both BW2 (UL1) and BW3 (UL2) together, and all UEs, and tries to send the allocations of all users on the same DL PDCCH. FIG. 18 shows the content of DCI format 0 message for the FDD case, which identifies the UL allocation for each user. Accordingly, the existing LTE standards may be used according to various embodiments described herein.

According to some embodiments, the node includes different DCIs for each user in the same PDCCH. For example, user 1 uses UL BW2, and user 2 uses UL BW3. The node inserts two different DCIs each in format 0, for UL allocation, one for UE1 for UL transmission in BW2, and another one for UE2 for UL transmission in BW3. If the UL transmission for other UEs needs to be included in this Subframe (SF), DCIs with format 0 may be inserted for each of them, followed by DCI formats 1, or 2 for DL transmissions. Note that both UE1 and UE2 DL transmissions take place in DL bandwidth BW1.

Figure 19:
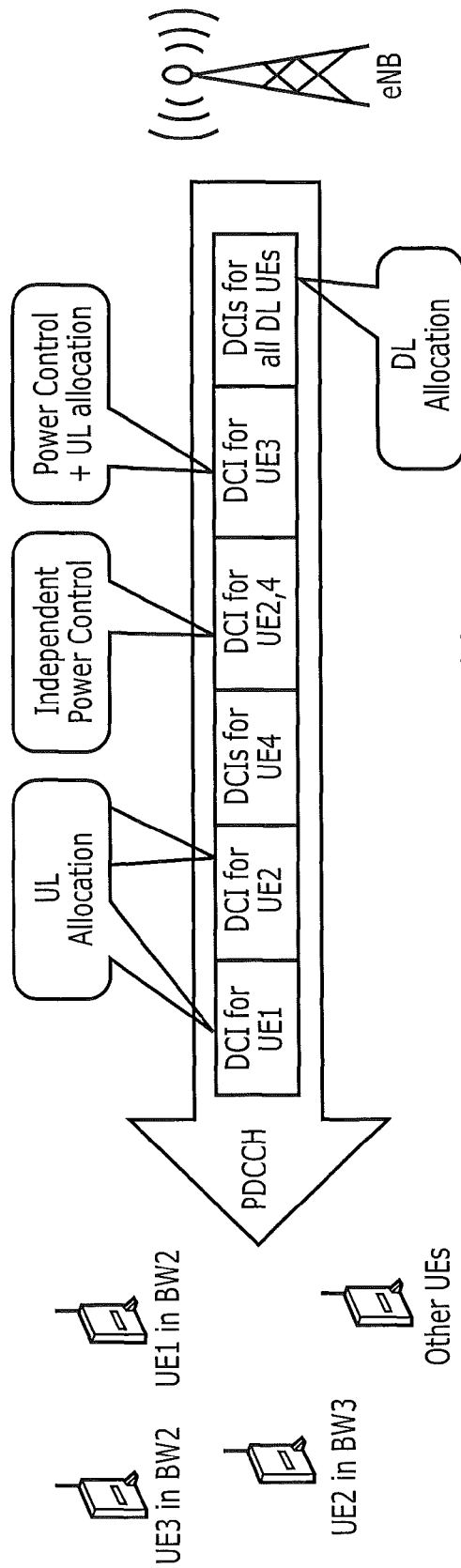
FIG. 19 is a block diagram of operation of a DCI format 0 message that may be used to schedule multiple uplink carriers according to various embodiments described herein.

The same PDCCH includes the DCIs for UL Transmit Power control (TPC) for the UEs, whether their UL transmission takes place in BW2 or BW3. Both UL allocation and UL power control commands may be integrated in the same DCI, or different DCIs may be used for UL TPC, and UL allocations. The concept is depicted in FIG. 19. Accordingly, an existing LTE standard may continue to be used, to allow a DCI to handle UEs in different uplink carriers.

Note that the DCI does not need to include any flag or field that indicates the UL bandwidth. The UE has already identified the UL BW through decoding the SIB2 or receiving MobilityControlInfo, as described earlier.

Various embodiments described herein may also include procedures for integrating UL feedback for different UEs in different UL BWs. The UL feedback may include Channel Quality Indicators (CQI), and possibly (depending on whether open loop or closed loop MIMO is used) Rank Indicator (RI) and/or Pre-coding Matrix Indicator (PMI). This information is sent through either PUCCH or PUSCH. Each PUSCH or PUCCH is scrambled with a UE specific scrambling sequence that is a function of UE C-RNTI, the slot number, and the Cell ID. Consequently, the node clearly can identify the UE through its C-RNTI, and accordingly the UL channel BW.

As a result, UE does not need to include any information about channel BW in PUSCH or PUCCH. The node can extract this information from C_RNTI. Note that each UE is granted a unique C_RNTI at the registration time. Since the node has the knowledge of the UL carrier for each UE, the node would not get confused between multiple UEs. The same concept applies to the HARQ process as well. Accordingly, an existing LTE standard may be used.

Note that various embodiments described herein can facilitate load balancing among multiple UL BWs. The node can enforce UEs to perform inter-frequency handover if required.

Accordingly, various embodiments described herein can allow a node to perform scheduling to allow the deployment of multiple UL bandwidths associated with one DL bandwidth, without the need for any standard change, so that the protocol can be transparent to the UEs. This would allow efficient load balancing for the node, as well.

It will also be understood that, in any embodiments described herein, the roles of the uplink and downlink may be reversed. Thus, for example, an uplink carrier may be paired with either a first downlink carrier or a second downlink carrier, according to various embodiments described herein. Different assignment/reassignment processes may need to be used.

Figure 20:
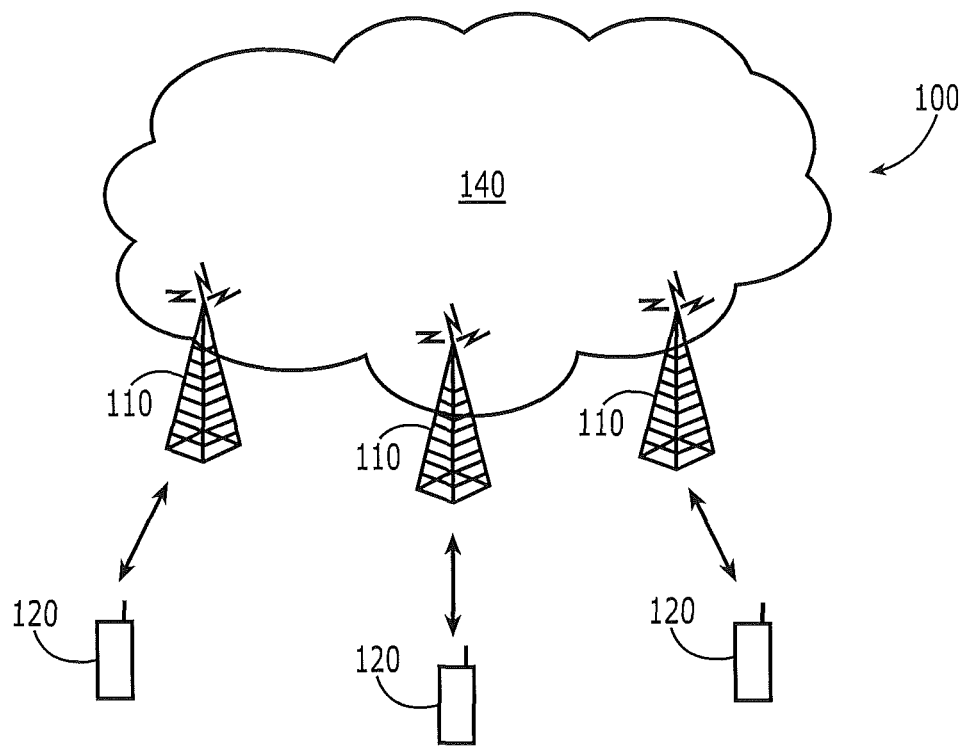
FIG. 20 is a block diagram of a wireless network, including devices and operating methods, according to various other embodiments described herein.

Although various embodiments described herein may be implemented in any appropriate type of telecommunication system supporting any suitable communication standards using any suitable components, particular embodiments of the described solutions may be implemented in an LTE network, such as that illustrated in FIG. 20.

As shown in FIG. 20, an example network 100 may include one or more instances of UEs 120 and one, or more nodes 110 capable of communicating with these UEs, along with any additional network elements 140 suitable to support communication between UEs or between a UE and another communication device (such as a landline telephone). Although the illustrated UEs 120 may represent communication devices that include any suitable combination of hardware and/or software, these UEs may, in particular embodiments, represent devices such as the example UE illustrated in greater detail by FIG. 21. Similarly, although the illustrated nodes 110 may represent network nodes that include any suitable combination of hardware and/or software, these nodes may, in particular embodiments, represent devices such as the example nodes illustrated in greater detail by FIG. 22.

Figure 21:
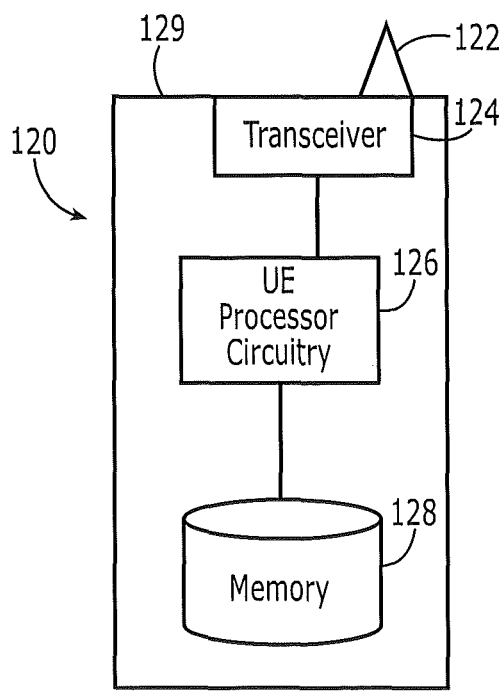
FIG. 21 is a block diagram of a user equipment according to various embodiments described herein.

As shown in FIG. 21, the example UE 120 includes UE processor circuitry 126, a memory 128, a transceiver 124, an antenna 122 and a housing 129. In particular embodiments, some or all of the functionality described above as being provided by a UE may be provided by the UE processor circuitry 126 executing instructions stored on a computer-readable medium, such as the memory 128 shown in FIG. 21. Alternative embodiments of the UE may include additional components beyond those shown in FIG. 21 that may be responsible for providing certain aspects of the UE's functionality, including any of the functionality described above and/or any functionality necessary to support the solution described above.

Figure 22:
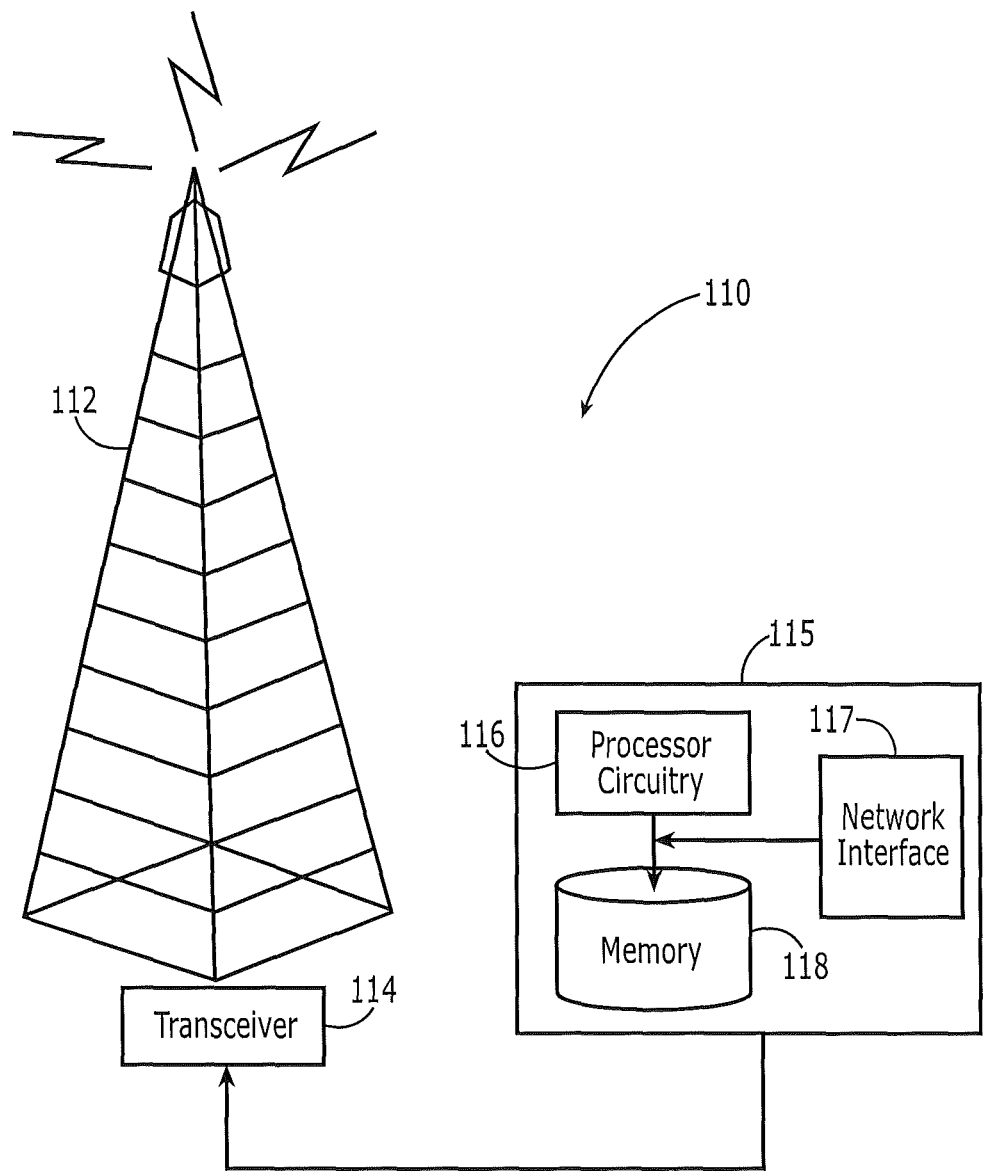
FIG. 22 is a block diagram of a node according to various embodiments described herein.

As shown in FIG. 22, the example node 110 includes node processor circuitry 116, a memory 118, a transceiver 114, an antenna 112 and a housing 115. In particular embodiments, some or all of the functionality described above as being provided by a home base station, an HeNB, an HNB, a micro/pico/femto base station, a base station controller, a node B, an eNB, a relay, and/or any other type of mobile communications node may be provided by the node 110 executing instructions stored on a computer-readable medium, such as the memory 118 shown in FIG. 22. Accordingly, a node according to various embodiments described herein can include a wireless transceiver 114 that is configured to wirelessly communicate with wireless User Equipment, such as the wireless User Equipment of FIG. 21, a network interface 117 that is configured to establish a communication path to an element 140 of a network 100, and processor circuitry 116. Alternative embodiments of the node 110 may include additional components responsible for providing additional functionality, including any of the functionality identified above and/or any functionality necessary to support the solution described above.

Various embodiments were described herein with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, when an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Furthermore, "coupled", "connected", "responsive", or variants thereof as used herein may include wirelessly coupled, connected, or responsive. Like numbers refer to like elements throughout. The terminology used herein is for the purpose of describing particular embodiments only and is not intended to be limiting of the invention. As used herein, the singular forms "a", "an" and "the" are intended to include the plural forms as well, unless the context clearly indicates otherwise. Well-known functions or constructions may not be described in detail for brevity and/or clarity.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. Moreover, as used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

Various embodiments described herein can operate in any of the following Radio Access Technologies: Advanced Mobile Phone Service (AMPS), ANSI-136, Global Standard for Mobile (GSM) communication, General Packet Radio Service (GPRS), enhanced data rates for GSM evolution (EDGE), DCS, PDC, PCS, code division multiple access (CDMA), wideband-CDMA, CDMA2000, Universal Mobile Telecommunications System (UMTS), 3GPP LTE (3$^{rd}$ Generation Partnership Project Long Term Evolution), 3GPP LTE-A (LTE Advanced) and/or IEEE 802.16 (Wi-MAX). For example, GSM operation can include reception/transmission in frequency ranges of about 824 MHz to about 849 MHz and about 869 MHz to about 894 MHz. EGSM operation can include reception/transmission in frequency ranges of about 880 MHz to about 914 MHz and about 925 MHz to about 960 MHz. DCS operation can include transmission/reception in frequency ranges of about 1410 MHz to about 1785 MHz and about 1805 MHz to about 1880 MHz. PDC operation can include transmission in frequency ranges of about 893 MHz to about 953 MHz and about 810 MHz to about 885 MHz. PCS operation can include transmission/reception in frequency ranges of about 1850 MHz to about 1910 MHz and about 1930 MHz to about 1990 MHz. 3GPP LTE operation can include transmission/reception in many different bands, as defined in 3GPP LTE documents TS 36.101 and TS 36.104. For example, Band 2 defined as frequency ranges of 1850 MHz to 1910 MHz as uplink and 1930 MHz to 1990 MHz as downlink. Other Radio Access Technologies and/or frequency bands can also be used in various embodiments described herein. All these systems are designed to operate in a variety of bands typically known as the International Mobile Telecommunications (IMT) bands that are defined by the International Telecommunications Union-Radio Communication Bureau (ITU-R) and can, in general, be located in frequency ranges between 200 MHz and 5 GHZ within the current state of the art. It should, however, be noted that various embodiments described herein are equally applicable for any radio system, and are not restricted in any way to the IMT bands in any way.

For purposes of illustration and explanation only, various embodiments of the present invention were described herein in the context of user equipment that are configured to carry out cellular communications (e.g., cellular voice and/or data communications). It will be understood, however, that the present invention is not limited to such embodiments and may be embodied generally in any wireless communication terminal that is configured to transmit and receive according to one or more radio access technologies.

As used herein, the term "user equipment" includes cellular and/or satellite radiotelephone(s) with or without a display (text/graphical); Personal Communications System (PCS) terminal(s) that may combine a radiotelephone with data processing, facsimile and/or data communications capabilities; Personal Digital Assistant(s) (PDA) or smart phone(s) that can include a radio frequency transceiver and a pager, Internet/Intranet access, Web browser, organizer, calendar and/or a global positioning system (GPS) receiver; and/or conventional laptop (notebook) and/or palmtop (netbook) computer(s) or other appliance(s), which include a radio frequency transceiver. As used herein, the term "user equipment" also includes any other radiating user device that may have time-varying or fixed geographic coordinates and/or may be portable, transportable, installed in a vehicle (aeronautical, maritime, or land-based) and/or situated and/or configured to operate locally and/or in a distributed fashion over one or more terrestrial and/or extra-terrestrial location(s). Finally, the term "node" includes any fixed, portable and/or transportable device that is configured to communicate with one or more user equipment and a core network, and includes, for example, terrestrial cellular base stations (including microcell, picocell, wireless access point and/or ad hoc communications access points) and satellites, that may be located terrestrially and/or that have a trajectory above the earth at any altitude.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, if used herein, the common abbreviation "e.g.", which derives from the Latin phrase exempli gratia, may be used to introduce or specify a general example or examples of a previously mentioned item, and is not intended to be limiting of such item. If used herein, the common abbreviation "i.e.", which derives from the Latin phrase id est, may be used to specify a particular item from a more general recitation.

Exemplary embodiments were described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by processor circuitry. These computer program instructions may be provided to processor circuitry of a general purpose computer circuit, special purpose computer circuit such as a digital processor, and/or other programmable data processor circuit to produce a machine, such that the instructions, which execute via the processor circuitry of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s). These computer program instructions may also be stored in a computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-eRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks.

Accordingly, embodiments of the present invention may be embodied in hardware and/or in software (including firmware, resident software, micro-code, etc.) that runs on a processor such as a digital signal processor, which may collectively be referred to as "processor circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments were disclosed herein, in connection with the following description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A node of a wireless network, the node comprising:
   processor circuitry that is configured to arrange a frequency division duplex communications link from the node to a user equipment using a downlink frequency carrier having a downlink frequency bandwidth, and from the user equipment directly to the node by selectively using either a first uplink frequency carrier having a first uplink frequency bandwidth or a second uplink frequency carrier that is spaced apart in frequency from the first uplink frequency carrier and having a second uplink frequency bandwidth, but not using both the first uplink frequency carrier having the first uplink frequency bandwidth and the second uplink frequency carrier that is spaced apart in frequency from the first uplink frequency carrier and having the second uplink frequency bandwidth; and
   a transceiver that is responsive to the processor circuitry and is configured to communicate with the user equipment over the frequency division duplex communications link by transmitting communications to the user equipment using the downlink frequency carrier, and by selectively receiving communications directly from the user equipment using either the first uplink frequency carrier or the second uplink frequency carrier, but not using both the first uplink frequency carrier having the first uplink frequency bandwidth and the second uplink frequency carrier that is spaced apart in frequency from the first uplink frequency carrier and having the second uplink frequency bandwidth.

2. The node according to claim 1:
   wherein the downlink frequency carrier is a first downlink frequency carrier having a first downlink frequency bandwidth, wherein the frequency division duplex communications link is a first frequency division duplex communications link, and wherein the processor circuitry is further configured to arrange a second frequency division duplex communications link directly from the node to the user equipment using a second downlink frequency carrier having a second downlink frequency bandwidth, and from the user equipment directly to the node using a third uplink frequency carrier having a third uplink frequency bandwidth; and wherein the transceiver is further configured to communicate with the user equipment over the second frequency division duplex communications link by transmitting communications to the user equipment using the second downlink frequency carrier and receiving communications directly from the user equipment using the third uplink frequency carrier.

3. The node according to claim 1:

wherein the processor circuitry is configured to arrange the frequency division duplex communications link by initially assigning the first uplink frequency carrier to the user equipment and by subsequently selectively handing over the user equipment to the second uplink frequency carrier; and wherein the transceiver is configured to communicate with the user equipment over the frequency division duplex communications link by transmitting communications to the user equipment using the downlink frequency carrier, by initially receiving communications from the user equipment using the first uplink frequency carrier and by subsequently selectively receiving communications from the user equipment using the second uplink frequency carrier while continuing to transmit communications to the user equipment using the downlink frequency carrier.

4. The node according to claim 3:

wherein the processor circuitry is configured to initially assign the first uplink frequency carrier to the user equipment and to subsequently selectively hand over the user equipment to the second uplink frequency carrier, by configuring an initial attachment message for the user equipment that identifies the downlink frequency carrier and the first uplink frequency carrier and by selectively configuring a handover message for the user equipment that continues to identify the downlink frequency carrier but identifies the second uplink frequency carrier; and wherein the transceiver is configured to initially receive communications from the user equipment using the first uplink frequency carrier and to subsequently selectively receive communications from the user equipment using the second uplink frequency carrier while continuing to transmit communications to the user equipment using the downlink frequency carrier, by transmitting the initial attachment message to the user equipment that identifies the downlink frequency carrier and the first uplink frequency carrier and by selectively transmitting the handover message to the user equipment that continues to identify the downlink frequency carrier but identifies the second uplink frequency carrier.

5. The node according to claim 4 wherein the node is included in a Long Term Evolution (LTE) wireless communications system, wherein the attachment message comprises a system information broadcast message that identifies the downlink frequency carrier and the first uplink frequency carrier, and wherein the handover message comprises a mobility control information message that continues to identify the downlink frequency carrier but identifies the second uplink frequency carrier.

6. The node according to claim 5 wherein the mobility control information message also identifies the downlink frequency bandwidth and the second uplink frequency bandwidth, and continues to identify a same target physical cell for the frequency division duplex communications link.

7. The node according to claim 1:

wherein the processor circuitry is further configured to arrange a plurality of the frequency division duplex communications links between the node and a respective plurality of user equipments, by arranging a first subset of the plurality of frequency division duplex communications links for a corresponding first subset of the user equipments using the downlink frequency carrier and the first uplink frequency carrier and by arranging a second subset of the plurality of frequency division duplex communications links for a corresponding second subset of the user equipments using the downlink frequency carrier and the second uplink frequency carrier; and wherein the transceiver is configured to communicate with the first subset of the user equipments using the downlink frequency carrier and the first uplink frequency carrier and with the corresponding second subset of the user equipments using the downlink frequency carrier and the second uplink frequency carrier.

8. The node according to claim 7 wherein the processor circuitry is further configured to arrange the plurality of the frequency division duplex communications links between the node and the respective plurality of user equipments, by initially assigning the plurality of frequency division duplex communications links for the plurality of user equipments using the downlink frequency carrier and the first uplink frequency carrier and by subsequently selectively handing over the second subset of the plurality of frequency division duplex communications links for the corresponding second subset of the user equipments using the downlink frequency carrier and the second uplink frequency carrier.

9. The node according to claim 8:

wherein the processor circuitry is further configured to initially assign the plurality of frequency division duplex communications links for the plurality of user equipments using the downlink frequency carrier and the first uplink frequency carrier by configuring an initial attachment message for the plurality of user equipments that identifies the downlink frequency carrier and the first uplink frequency carrier, and to subsequently selectively hand over the second subset of the plurality of frequency division duplex communications links for the corresponding second subset of the user equipments using the downlink frequency carrier and the second uplink frequency carrier by selectively configuring a handover message for the second subset of the plurality of user equipments that continues to identify the downlink frequency carrier but identifies the second uplink frequency carrier.

10. The node according to claim 9 wherein the node is included in a Long Term Evolution (LTE) wireless communications system, wherein the attachment message comprises a system information broadcast message that identifies the downlink frequency carrier and the first uplink frequency carrier, and wherein the handover message comprises a mobility control information message that that continues to identify the downlink frequency carrier but identifies the second uplink frequency carrier.

11. The node according to claim 10 wherein the mobility control information message also identifies the downlink frequency bandwidth and the second uplink frequency bandwidth, and continues to identify a same target physical cell for the duplex communication link.

12. The node according to claim 1 wherein the downlink frequency bandwidth and the first uplink frequency bandwidth are a same bandwidth and wherein the second uplink frequency bandwidth is different from the downlink frequency bandwidth and the first uplink frequency bandwidth.

13. The node according to claim 1 wherein the processor circuitry comprises a scheduler that includes a first baseband or signal processing card for the downlink frequency carrier and the first uplink frequency carrier, and a second baseband or signal processing card for the downlink frequency carrier and the second uplink frequency carrier.

14. A user equipment of a wireless network, the user equipment comprising:
    processor circuitry that is configured to establish a frequency division duplex communications link from a node of the wireless network to the user equipment using a downlink frequency carrier having a downlink frequency bandwidth, and from the user equipment directly to the node by selectively using either a first uplink frequency carrier having a first uplink frequency bandwidth or a second uplink frequency carrier that is spaced apart in frequency from the first uplink frequency carrier and having a second uplink frequency bandwidth, but not using both the first uplink frequency carrier having the first uplink frequency bandwidth and the second uplink frequency carrier that is spaced apart in frequency from the first uplink frequency carrier and having the second uplink frequency bandwidth; and
    a transceiver that is responsive to the processor circuitry and is configured to communicate with the node over the frequency division duplex communications link by receiving communications from the node using the downlink frequency carrier, and by selectively transmitting communications directly to the node using either the first uplink frequency carrier or the second uplink frequency carrier, but not using both the first uplink frequency carrier having the first uplink frequency bandwidth and the second uplink frequency carrier that is spaced apart in frequency from the first uplink frequency carrier and having the second uplink frequency bandwidth.

15. The user equipment according to claim 14:
    wherein the downlink frequency carrier is a first downlink frequency carrier having a first downlink frequency bandwidth, wherein the frequency division duplex communications link is a first frequency division duplex communications link, and wherein the processor circuitry is further configured to establish a second frequency division duplex communications link from the node directly to the user equipment using a second downlink frequency carrier having a second downlink frequency bandwidth, and from the user equipment directly to the node using a third uplink frequency carrier having a third uplink frequency bandwidth; and
    wherein the transceiver is further configured to communicate with the node over the second frequency division duplex communications link by receiving communications from the node using the second downlink frequency carrier and transmitting communications directly to the node using the third uplink frequency carrier.

16. The user equipment according to claim 14:
    wherein the processor circuitry is configured to arrange the frequency division duplex communications link by initially using the first uplink frequency carrier and by subsequently using the second uplink frequency carrier; and
    wherein the transceiver is configured to communicate with the node over the frequency division duplex communications link by receiving communications from the node using the downlink frequency carrier, by initially transmitting communications to the node using the first uplink frequency carrier and by subsequently transmitting communications to the node using the second uplink frequency carrier while continuing to receiving communications from the node using the downlink frequency carrier.

17. The user equipment according to claim 16:
    wherein the processor circuitry is configured to initially use the first uplink frequency carrier and to subsequently use the second uplink frequency carrier, by processing initial attachment message for the user equipment that identifies the downlink frequency carrier and the first uplink frequency carrier and by processing a subsequent handover message for the user equipment that continues to identify the downlink frequency carrier but identifies the second uplink frequency carrier.

18. The user equipment according to claim 17 wherein the user equipment is included in a Long Term Evolution (LTE) wireless communications system, wherein the attachment message comprises a system information broadcast message that identifies the downlink frequency carrier and the first uplink frequency carrier, and wherein the handover message comprises a mobility control information message that that continues to identify the downlink frequency carrier but identifies the second uplink frequency carrier.

19. The user equipment according to claim 18 wherein the mobility control information message also identifies the downlink frequency bandwidth and the second uplink frequency bandwidth, and continues to identify a same target physical cell for the frequency division duplex communications link.

20. The user equipment according to claim 14 wherein the downlink frequency bandwidth and the first uplink frequency bandwidth are a same bandwidth and wherein the second uplink frequency bandwidth is different from the downlink frequency bandwidth and the first uplink frequency bandwidth.

21. A method of operating a node of a wireless network, the method comprising:
    arranging a frequency division duplex communications link from the node to a user equipment using a downlink frequency carrier having a downlink frequency bandwidth, and from the user equipment directly to the node by selectively using either a first uplink frequency carrier having a first uplink frequency bandwidth or a second uplink frequency carrier that is spaced apart in frequency from the first uplink frequency carrier and having a second uplink frequency bandwidth, but not using both the first uplink frequency carrier having the first uplink frequency bandwidth and the second uplink frequency carrier that is spaced apart in frequency from the first uplink frequency carrier and having the second uplink frequency bandwidth; and
    communicating with the user equipment over the frequency division duplex communications link by transmitting communications to the user equipment using the downlink frequency carrier, and by selectively receiving communications directly from the user equipment using either the first uplink frequency carrier or the second uplink frequency carrier, but not using both the first uplink frequency carrier having the first uplink frequency bandwidth and the second uplink frequency carrier that is spaced apart in frequency from the first uplink frequency carrier and having the second uplink frequency bandwidth.

22. The method according to claim 21:
wherein the downlink frequency carrier is a first downlink frequency carrier having a first downlink frequency bandwidth, wherein the frequency division duplex communications link is a first frequency division duplex communications link, and wherein the method further comprises:
arranging a second frequency division duplex communications link directly from the node to the user equipment using a second downlink frequency carrier having a second downlink frequency bandwidth, and from the user equipment directly to the node using a third uplink frequency carrier having a third uplink frequency bandwidth; and
communicating with the user equipment over the second frequency division duplex communications link by transmitting communications to the user equipment using the second downlink frequency carrier and receiving communications directly from the user equipment using the third uplink frequency carrier.

23. The method according to claim 21:
wherein the arranging a frequency division duplex communications link comprises initially assigning the first uplink frequency carrier to the user equipment and subsequently selectively handing over the user equipment to the second uplink frequency carrier; and
wherein the communicating with the user equipment comprises transmitting communications to the user equipment using the downlink frequency carrier, initially receiving communications from the user equipment using the first uplink frequency carrier and subsequently selectively receiving communications from the user equipment using the second uplink frequency carrier while continuing to transmit communications to the user equipment using the downlink frequency carrier.

24. The method according to claim 23:
wherein the initially assigning the first uplink frequency carrier to the user equipment and subsequently selectively handing over the user equipment to the second uplink frequency carrier comprises configuring an initial attachment message for the user equipment that identifies the downlink frequency carrier and the first uplink frequency carrier and selectively configuring a handover message for the user equipment that continues to identify the downlink frequency carrier but identifies the second uplink frequency carrier; and
wherein the initially receiving communications from the user equipment using the first uplink frequency carrier and subsequently selectively receiving communications from the user equipment using the second uplink frequency carrier while continuing to transmit communications to the user equipment using the downlink frequency carrier comprises transmitting the initial attachment message to the user equipment that identifies the downlink frequency carrier and the first uplink frequency carrier and selectively transmitting the handover message to the user equipment that continues to identify the downlink frequency carrier but identifies the second uplink frequency carrier.

25. The method according to claim 24 wherein the node is included in a Long Term Evolution (LTE) wireless communications system, wherein the attachment message comprises a system information broadcast message that identifies the downlink frequency carrier and the first uplink frequency carrier, and wherein the handover message comprises a mobility control information message that continues to identify the downlink frequency carrier but identifies the second uplink frequency carrier.

26. The method according to claim 25 wherein the mobility control information message also identifies the downlink frequency bandwidth and the second uplink frequency bandwidth, and continues to identify a same target physical cell for the frequency division duplex communications link.

27. The method according to claim 21:
wherein the arranging a plurality of the frequency division duplex communications links between the node and a respective plurality of user equipments comprises arranging a first subset of the plurality of frequency division duplex communications links for a corresponding first subset of the user equipments using the downlink frequency carrier and the first uplink frequency carrier and arranging a second subset of the plurality of frequency division duplex communications links for a corresponding second subset of the user equipments using the downlink frequency carrier and the second uplink frequency carrier; and
wherein the communicating with the user equipment comprises communicating with the first subset of the user equipments using the downlink frequency carrier and the first uplink frequency carrier and with the corresponding second subset of the user equipments using the downlink frequency carrier and the second uplink frequency carrier.

28. The method according to claim 27 wherein the arranging the plurality of the frequency division duplex communications links between the node and the respective plurality of user equipments comprises initially assigning the plurality of frequency division duplex communications links for the plurality of user equipments using the downlink frequency carrier and the first uplink frequency carrier and subsequently selectively handing over the second subset of the plurality of frequency division duplex communications links for the corresponding second subset of the user equipments using the downlink frequency carrier and the second uplink frequency carrier.

29. The method according to claim 28:
wherein initially assigning the plurality of frequency division duplex communications links for the plurality of user equipments using the downlink frequency carrier and the first uplink frequency carrier comprises configuring an initial attachment message for the plurality of user equipments that identifies the downlink frequency carrier and the first uplink frequency carrier, and wherein the subsequently selectively handing over the second subset of the plurality of frequency division duplex communications links for the corresponding second subset of the user equipments using the downlink frequency carrier and the second uplink frequency carrier comprises selectively configuring a handover message for the second subset of the plurality of user equipments that continues to identify the downlink frequency carrier but identifies the second uplink frequency carrier.

30. The method according to claim 29 wherein the node is included in a Long Term Evolution (LTE) wireless communications system, wherein the attachment message comprises a system information broadcast message that identifies the downlink frequency carrier and the first uplink frequency carrier, and wherein the handover message comprises a mobility control information message that continues to identify the downlink frequency carrier but identifies the second uplink frequency carrier.

31. The method according to claim 30 wherein the mobility control information message also identifies the downlink frequency bandwidth and the second uplink frequency bandwidth, and continues to identify a same target physical cell for the duplex communication link.

32. The method according to claim 21 wherein the downlink frequency bandwidth and the first uplink frequency bandwidth are a same bandwidth and wherein the second uplink frequency bandwidth is different from the downlink frequency bandwidth and the first uplink frequency bandwidth.

33. A method of operating user equipment of a wireless network, the method comprising:
establishing a frequency division duplex communications link from a node of the wireless network to the user equipment using a downlink frequency carrier having a downlink frequency bandwidth, and from the user equipment directly to the node by selectively using either a first uplink frequency carrier having a first uplink frequency bandwidth or a second uplink frequency carrier that is spaced apart in frequency from the first uplink frequency carrier and having a second uplink frequency bandwidth, but not using both the first uplink frequency carrier having the first uplink frequency bandwidth and the second uplink frequency carrier that is spaced apart in frequency from the first uplink frequency carrier and having the second uplink frequency bandwidth; and
communicating with the node over the frequency division duplex communications link by receiving communications from the node using the downlink frequency carrier, and by selectively transmitting communications directly to the node using either the first uplink frequency carrier or the second uplink frequency carrier, but not using both the first uplink frequency carrier having the first uplink frequency bandwidth and the second uplink frequency carrier that is spaced apart in frequency from the first uplink frequency carrier and having the second uplink frequency bandwidth.

34. The method according to claim 33:
wherein the downlink frequency carrier is a first downlink frequency carrier having a first downlink frequency bandwidth, wherein the frequency division duplex communications link is a first frequency division duplex communications link, and wherein the method further comprises:
establishing a second frequency division duplex communications link directly from the node to the user equipment using a second downlink frequency carrier having a second downlink frequency bandwidth, and from the user equipment directly to the node using a third uplink frequency carrier having a third uplink frequency bandwidth; and
communicating with the node over the second frequency division duplex communications link by receiving communications from the node using the second downlink frequency carrier and transmitting communications directly to the node using the third uplink frequency carrier.

35. The method according to claim 33:
wherein the arranging a frequency division duplex communications link comprises initially using the first uplink frequency carrier and by subsequently using the second uplink frequency carrier; and
wherein the communicating with the node over the frequency division duplex communications link by receiving communications from the node using the downlink frequency carrier comprises initially transmitting communications to the node using the first uplink frequency carrier and subsequently transmitting communications to the node using the second uplink frequency carrier while continuing to receiving communications from the node using the downlink frequency carrier.

36. The method according to claim 35:
wherein the initially using the first uplink frequency carrier and subsequently using the second uplink frequency carrier comprises processing initial attachment message for the user equipment that identifies the downlink frequency carrier and the first uplink frequency carrier and processing a subsequent handover message for the user equipment that continues to identify the downlink frequency carrier but identifies the second uplink frequency carrier.

37. The method according to claim 36 wherein the user equipment is included in a Long Term Evolution (LTE) wireless communications system, wherein the attachment message comprises a system information broadcast message that identifies the downlink frequency carrier and the first uplink frequency carrier, and wherein the handover message comprises a mobility control information message that continues to identify the downlink frequency carrier but identifies the second uplink frequency carrier.

38. The method according to claim 36 wherein the mobility control information message also identifies the downlink frequency bandwidth and the second uplink frequency bandwidth, and continues to identify a same target physical cell for the frequency division duplex communications link.

39. The method according to claim 33 wherein the downlink frequency bandwidth and the first uplink frequency bandwidth are a same bandwidth and wherein the second uplink frequency bandwidth is different from the downlink frequency bandwidth and the first uplink frequency bandwidth.

\* \* \* \* \*